United States Patent
Newman et al.

(10) Patent No.: US 10,402,938 B1
(45) Date of Patent: Sep. 3, 2019

(54) SYSTEMS AND METHODS FOR MODIFYING IMAGE DISTORTION (CURVATURE) FOR VIEWING DISTANCE IN POST CAPTURE

(71) Applicant: GOPRO, INC., San Mateo, CA (US)

(72) Inventors: David Newman, San Diego, CA (US); Balu Adsumilli, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 228 days.

(21) Appl. No.: 15/476,884

(22) Filed: Mar. 31, 2017

Related U.S. Application Data

(60) Provisional application No. 62/316,476, filed on Mar. 31, 2016.

(51) Int. Cl.
  *G06T 3/00* (2006.01)
  *H04N 5/232* (2006.01)
  (Continued)

(52) U.S. Cl.
  CPC .......... *G06T 3/0018* (2013.01); *G06K 9/2054* (2013.01); *G06T 3/0025* (2013.01);
  (Continued)

(58) Field of Classification Search
  None
  See application file for complete search history.

(56) References Cited

U.S. PATENT DOCUMENTS

| | | |
|---|---|---|
| 6,633,685 B1 | 10/2003 | Kusama |
| 7,222,356 B1 | 5/2007 | Yonezawa |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

PCT International Search Report and Written Opinion for PCT/US2015/023680, dated Oct. 6, 2015, 13 pages.

(Continued)

*Primary Examiner* — Christopher G Findley
(74) *Attorney, Agent, or Firm* — Esplin & Associates, PC

(57) ABSTRACT

Systems and methods for modifying image distortion (curvature) for viewing distance in post capture. Presentation of imaging content on a content display device may be characterized by a presentation field of view (FOV). Presentation FOV may be configured based on screen dimensions of the display device and distance between the viewer and the screen. Imaging content may be obtained by an activity capture device characterized by a wide capture field of view lens (e.g., fish-eye). Images may be transformed into rectilinear representation for viewing. When viewing images using presentation FOV that may narrower than capture FOV, transformed rectilinear images may appear distorted. A transformation operation may be configured to account for presentation FOV-capture FOV mismatch. In some implementations, the transformation may include fish-eye to rectilinear transformation characterized by a transformation strength that may be configured based on a ratio of the presentation FOV to the capture FOV.

19 Claims, 11 Drawing Sheets

(51) Int. Cl.
*G06K 9/20* (2006.01)
*H04N 5/262* (2006.01)

(52) U.S. Cl.
CPC ..... *H04N 5/23206* (2013.01); *H04N 5/23238* (2013.01); *H04N 5/2624* (2013.01)

(56) References Cited

U.S. PATENT DOCUMENTS

| | | |
|---|---|---|
| 7,483,618 B1 | 1/2009 | Edwards |
| 7,512,886 B1 | 3/2009 | Herberger |
| 7,885,426 B2 | 2/2011 | Golovchinsky |
| 7,970,240 B1 | 6/2011 | Chao |
| 8,180,161 B2 | 5/2012 | Haseyama |
| 8,396,878 B2 | 3/2013 | Acharya |
| 8,446,433 B1 | 5/2013 | Mallet |
| 8,606,073 B2 | 12/2013 | Woodman |
| 8,611,422 B1 | 12/2013 | Yagnik |
| 8,612,463 B2 | 12/2013 | Brdiczka |
| 8,718,447 B2 | 5/2014 | Yang |
| 8,763,023 B1 | 6/2014 | Goetz |
| 8,774,560 B2 | 7/2014 | Sugaya |
| 8,971,623 B2 | 3/2015 | Gatt |
| 8,990,328 B1 | 3/2015 | Grigsby |
| 9,041,727 B2 | 5/2015 | Ubillos |
| 9,077,956 B1 | 7/2015 | Morgan |
| 9,142,257 B2 | 9/2015 | Woodman |
| 9,253,533 B1 | 2/2016 | Morgan |
| 9,342,376 B2 | 5/2016 | Jain |
| 9,396,385 B2 | 7/2016 | Bentley |
| 9,418,283 B1 | 8/2016 | Natarajan |
| 9,423,939 B2* | 8/2016 | Schwesinger .......... A63F 13/06 |
| 9,715,862 B2* | 7/2017 | Sakakima ................ G09G 5/02 |
| 2001/0019355 A1* | 9/2001 | Koyanagi ............... H04N 5/232 348/36 |
| 2002/0165721 A1 | 11/2002 | Chang |
| 2004/0001706 A1 | 1/2004 | Jung |
| 2004/0128317 A1 | 7/2004 | Sull |
| 2005/0025454 A1 | 2/2005 | Nakamura |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0183843 A1 | 7/2008 | Gavin |
| 2008/0253735 A1 | 10/2008 | Kuspa |
| 2008/0313541 A1 | 12/2008 | Shafton |
| 2009/0019995 A1 | 1/2009 | Miyajima |
| 2009/0125559 A1 | 5/2009 | Yoshino |
| 2009/0213270 A1 | 8/2009 | Ismert |
| 2009/0252474 A1 | 10/2009 | Nashida |
| 2010/0046842 A1 | 2/2010 | Conwell |
| 2010/0086216 A1 | 4/2010 | Lee |
| 2010/0104261 A1 | 4/2010 | Liu |
| 2010/0183280 A1 | 7/2010 | Beauregard |
| 2010/0199182 A1 | 8/2010 | Lanza |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0274714 A1 | 10/2010 | Sims |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0318660 A1 | 12/2010 | Balsubramanian |
| 2011/0075990 A1 | 3/2011 | Eyer |
| 2011/0093798 A1 | 4/2011 | Shahraray |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2011/0293250 A1 | 12/2011 | Deever |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0141019 A1 | 6/2012 | Zhang |
| 2012/0210205 A1 | 8/2012 | Sherwood |
| 2012/0246114 A1 | 9/2012 | Edmiston |
| 2012/0283574 A1 | 11/2012 | Park |
| 2012/0311448 A1 | 12/2012 | Achour |
| 2013/0136193 A1 | 5/2013 | Hwang |
| 2013/0151970 A1 | 6/2013 | Achour |
| 2013/0166303 A1 | 6/2013 | Chang |
| 2013/0182166 A1 | 7/2013 | Shimokawa |
| 2013/0195429 A1 | 8/2013 | Fay |
| 2013/0197967 A1 | 8/2013 | Pinto |
| 2013/0208942 A1 | 8/2013 | Davis |
| 2013/0235071 A1 | 9/2013 | Ubillos |
| 2013/0239051 A1 | 9/2013 | Albouze |
| 2013/0259390 A1 | 10/2013 | Dunlop |
| 2013/0259399 A1 | 10/2013 | Ho |
| 2013/0282747 A1 | 10/2013 | Cheng |
| 2013/0283301 A1 | 10/2013 | Avedissian |
| 2013/0287214 A1 | 10/2013 | Resch |
| 2013/0300939 A1 | 11/2013 | Chou |
| 2013/0318443 A1 | 11/2013 | Bachman |
| 2013/0330019 A1 | 12/2013 | Kim |
| 2013/0343727 A1 | 12/2013 | Rav-Acha |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0149865 A1 | 5/2014 | Tanaka |
| 2014/0152762 A1 | 6/2014 | Ukil |
| 2014/0161351 A1 | 6/2014 | Yagnik |
| 2014/0165119 A1 | 6/2014 | Liu |
| 2014/0169766 A1 | 6/2014 | Yu |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0245336 A1 | 8/2014 | Lewis, II |
| 2014/0282661 A1 | 9/2014 | Martin |
| 2014/0300644 A1 | 10/2014 | Gillard |
| 2014/0328570 A1 | 11/2014 | Cheng |
| 2014/0334796 A1 | 11/2014 | Galant |
| 2014/0341528 A1 | 11/2014 | Mahate |
| 2014/0366052 A1 | 12/2014 | Ives |
| 2015/0015680 A1 | 1/2015 | Wang |
| 2015/0022355 A1 | 1/2015 | Pham |
| 2015/0029089 A1 | 1/2015 | Kim |
| 2015/0039646 A1 | 2/2015 | Sharifi |
| 2015/0067811 A1 | 3/2015 | Agnew |
| 2015/0071547 A1 | 3/2015 | Keating |
| 2015/0113009 A1 | 4/2015 | Zhou |
| 2015/0156247 A1 | 6/2015 | Hensel |
| 2015/0186073 A1 | 7/2015 | Pacurariu |
| 2015/0287435 A1 | 10/2015 | Land |
| 2015/0318020 A1 | 11/2015 | Pribula |
| 2015/0373281 A1 | 12/2015 | White |
| 2015/0375117 A1 | 12/2015 | Thompson |
| 2015/0382083 A1 | 12/2015 | Chen |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0094601 A1 | 3/2016 | Besehanic |
| 2016/0103830 A1 | 4/2016 | Cheong |
| 2016/0189752 A1 | 6/2016 | Galant |
| 2016/0225405 A1 | 8/2016 | Matias |
| 2016/0225410 A1 | 8/2016 | Lee |
| 2016/0234345 A1 | 8/2016 | Roberts |
| 2016/0260000 A1 | 9/2016 | Yamakawa |
| 2016/0286235 A1 | 9/2016 | Yamamoto |

(56) References Cited

U.S. PATENT DOCUMENTS

| | | |
|---|---|---|
| 2016/0292881 A1 | 10/2016 | Bose |
| 2016/0358603 A1 | 12/2016 | Azam |
| 2016/0366330 A1 | 12/2016 | Boliek |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |
| WO | 2012057623 | 5/2012 |
| WO | 2012057623 A1 | 5/2012 |
| WO | 2012086120 A1 | 6/2012 |

OTHER PUBLICATIONS

Ernoult, Emeric, "How to Triple Your YouTube Video Views with Facebook", SocialMediaExaminer.com, Nov. 26, 2012, 16 pages.
PCT International Preliminary Report on Patentability for PCT/US2015/023680, dated Oct. 4, 2016, 10 pages.
PCT International Search Report for PCT/US15/23680 dated Aug. 3, 2015, 4 pages.
PCT International Search Report for PCT/US15/41624 dated Nov. 4, 2015, 5 pages.
PCT International Written Opinion for PCT/US2015/041624, dated Dec. 17, 2015, 7 Pages.
PCT International Search Report and Written Opinion for PCT/US15/12086 dated Mar. 17, 2016, 20 pages.
Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50x fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512.03385, 2015, 12 pgs.
Han et al., Deep Compression: Compressing Deep Neural Networks with Pruning, Trained Quantization and Huffman Coding, International Conference on Learning Representations 2016, 14 pgs.
Iandola et al., "SqueezeNet: AlexNet-level accuracy with 50x fewer parameters and <0.5MB model size", arXiv:1602.07360v3 [cs.CV] Apr. 6, 2016 (9 pgs.).
Yang et al., "Unsupervised Extraction of Video Highlights Via Robust Recurrent Auto-encoders" arXiv:1510.01442v1 [cs.CV] Oct. 6, 2015 (9 pgs).
Tran et al., "Learning Spatiotemporal Features with 3D Convolutional Networks", arXiv:1412.0767 [cs.CV] Dec. 2, 2014 (9 pgs).
FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.
FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding_html>.
Nicole Lee, Twitter's Periscope is the best livestreaming video app yet; Mar. 26, 2015 URL:http://www.engadget.com/2015/03/26/periscope/ [Retrieved Aug. 25, 2015] 11 pages.
Japanese Office Action for JP Application No. 2013-140131, dated Aug. 5, 2014, 6 pages.
Office Action for U.S. Appl. No. 13/831,124, dated Mar. 19, 2015, 14 pages.
PSonar URL: http://www.psonar.com/about retrieved on Aug. 24, 2016, 3 pages.

\* cited by examiner

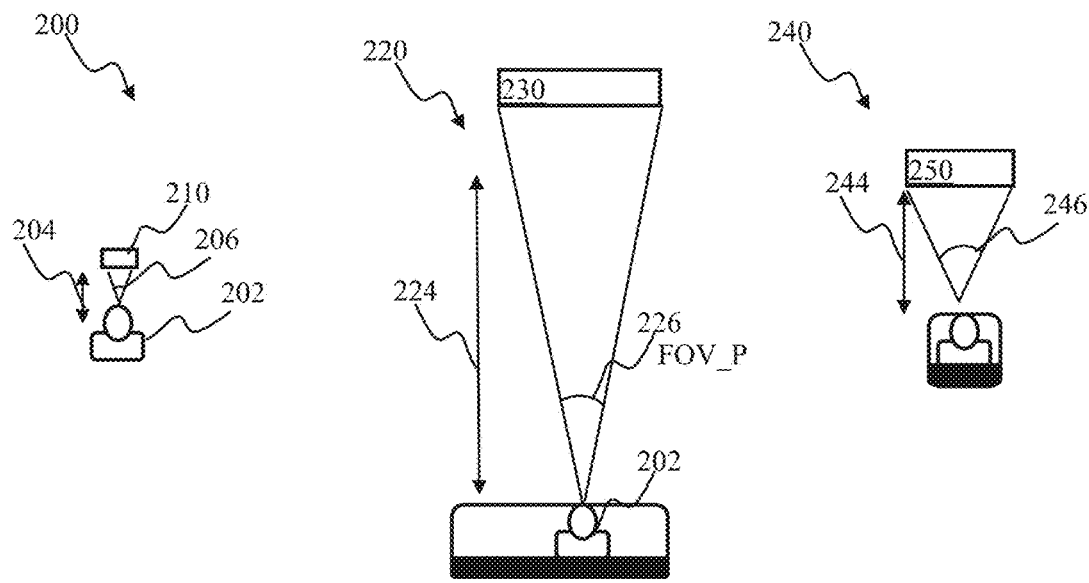
FIG. 2A
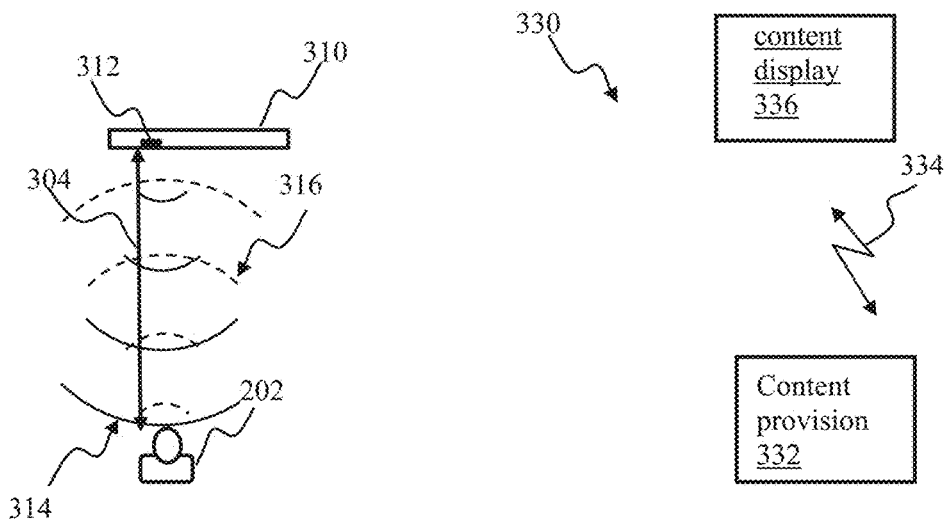
FIG. 2B
FIG. 3

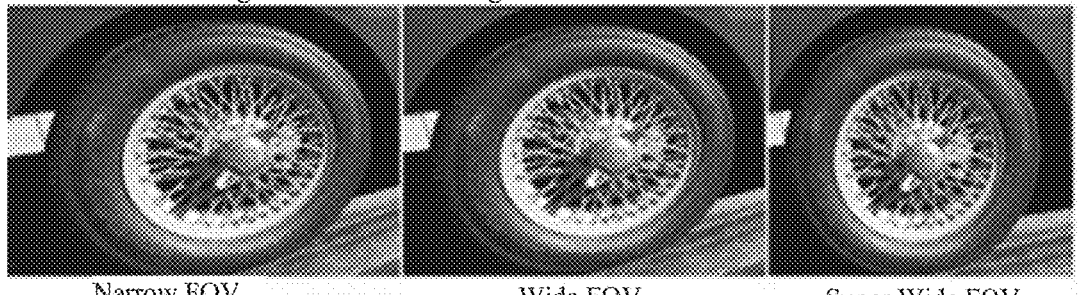
Rectilinear 120° Image at Different Viewing FOVs
| FIG. 6A | FIG. 6B | FIG. 6C |
|---|---|---|
| Narrow FOV (smartphone) | Wide FOV (near front of a movie theater) | Super Wide FOV (near front of IMAX theater) |
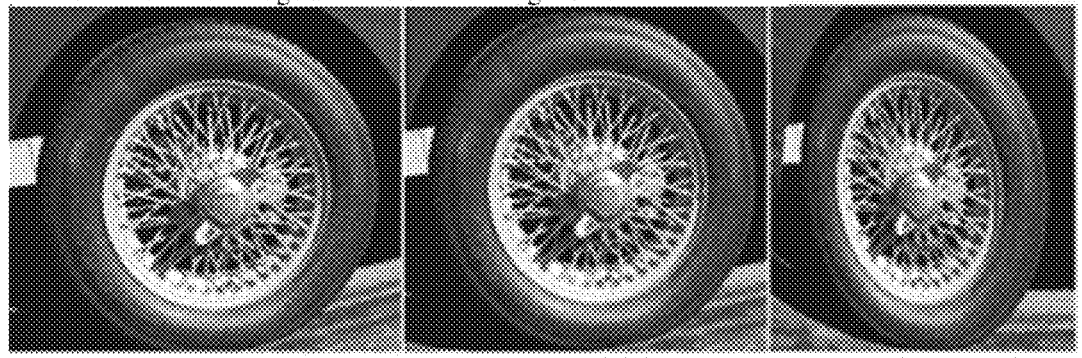
HERO4 Wide 120° Image at Different Viewing FOVs
| FIG. 6D | FIG. 6E | FIG. 6F |
|---|---|---|
| Narrow FOV (smartphone) | Wide FOV (near front of a movie theater) | Super Wide FOV (near front of IMAX theater) |

US 10,402,938 B1

SYSTEMS AND METHODS FOR MODIFYING IMAGE DISTORTION (CURVATURE) FOR VIEWING DISTANCE IN POST CAPTURE

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to presenting image and/or video content and more particularly in one exemplary aspect to modifying image curvature for viewing distance in post capture.

Description of Related Art

Activity capture devices (e.g., GoPro activity cameras) may include a lens characterized by a wide field of view (FOV) and/or high curvature. Such lens may be referred to as fish-eye. Images captured with a fish-eye lens may appear distorted when viewed on a television (TV) and/or portable device.

SUMMARY

In one aspect of the disclosure, a system for providing images of imaging content may comprise an electronic storage, a communications interface, one or more processors, and/or other components. The electronic storage may be configured to store the imaging content and/or other information. The communications interface may be configured to communicate a bit stream and/or other information to a client device. The client device may include a display. The processor(s) may be configured to execute a plurality of computer readable instructions configured to (1). access the imaging content characterized by a capture field of view and a capture projection; (2) determine a presentation field of view associated with displaying the images of the imaging content on the display; (3) obtain a transformation operation configured to transform the images of the imaging content from the capture projection based on the capture field of view and the presentation field of view; and (4) transform the images of the imaging content for presentation on the display using the transformation operation.

In some implementations, the capture projection may include a fish eye projection and/or other projections. In some implementations, the presentation field of view may be determined based on dimensions of the display and a viewing distance between the display and a user. In some implementations, the viewing distance between the display and the user may be determined based on sensor information generated by a sensor. In some implementations, the sensor may include a proximity sensor, a light sensor, and/or other sensors. In some implementations, the viewing distance between the display and the user may be determined based on a typical viewing distance associated with a type of the client device and/or other information. In some implementations, the transformation operation may account for a mismatch between the capture field of view and the presentation field of view. In some implementations, the transformation operation may include a curve-to-rectilinear transformation based on a match between the capture field of view and the presentation field of view.

In one aspect of the disclosure, a method may transform images of imaging content. The method may comprise (1) obtaining an image capture field of view using a metadata portion of the imaging content; (2) determining a dimension of a display of a content display device; (3) obtaining a viewing distance between the display and a user using sensor information; (4) obtaining a viewing field of view based on the viewing distance and the dimension of the display; and (5) obtaining an image transformation operation to transform the images of the imaging content from an image source projection based on the capture field of view and the viewing field of view.

In some implementations, the image transformation operation may reduce apparent motion within the images of the imaging content. In some implementations, the image transformation operation may be applied to the images of the imaging content by a server. In some implementations, the image transformation operation may be applied to the images of the imaging content by a camera or a smartphone. In some implementations, the image transformation operation may be applied to the images of the imaging content in real-time as a function of the viewing distance between the display and the user. In some implementations, the image transformation operation may include a first image transformation operation obtained based on a first viewing field of view and a second image transformation operation obtained based on a second viewing field of view.

In one aspect of the disclosure, a portable content display system may comprise a display, a communications interface, one or more processors, and/or other components. The processor(s) may be configured to execute a plurality of computer readable instructions configured to: (1) access a source image of imaging content via the communications interface; (2) obtain a capture field of view of the source image; (3) obtain dimensions of the display; (4) obtain a presentation field of view based on a viewing distance between the display and a user and the dimensions of the display; (5) obtain an image transformation to transform the source image from a capture projection to a display projection, the image transformation configured based on the capture field of view and the presentation field of view; and (6) obtain a transformed image based on applying the image transformation to the source image.

In some implementations, the image transformation may be configured based on a ratio of the capture field of view to the presentation field of view. In some implementations, the imaging content may include a video or a sequence of images. In some implementations, the capture field of view may be obtained based on curvature information of an optical element used to capture the imaging content. In some implementations, the curvature information may include coefficients of a polynomial representation characterizing a curvature of the optical element. In some implementations, the curvature information may be stored in metadata of the imaging content.

BRIEF DESCRIPTION OF THE DRAWINGS

FIG. 2A illustrates presentation field view for a variety of content display configurations, in accordance with some implementation.

FIG. 2B is a graphical illustration depicting determination of a viewing distance for obtaining the presentation field of view in accordance with one implementation.

FIG. 3 is a functional block diagram illustrating a system for providing content in accordance with one implementation.

FIGS. 6A-6F are simulated images depicting distortion for different image representations and presentation field of view, in accordance with some implementation.

All Figures disclosed herein are © Copyright 2017 GoPro Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Systems and methods for modifying image distortion (curvature) for viewing distance in post capture. Presentation of imaging content on a content display device may be characterized by a presentation field of view. Presentation field of view (FOV) may be configured based on screen dimensions of the display device and distance between the viewer and the screen. Imaging content may be obtained by an activity capture device characterized by a wide capture field of view lens (e.g., fish-eye). Images may be transformed into rectilinear representation for viewing. When viewing images using presentation FOV that may narrower than capture FOV, transformed rectilinear images may appear distorted. A transformation operation may be configured to account for presentation FOV-capture FOV mismatch. In some implementations, the transformation may include fish-eye to rectilinear transformation characterized by a transformation strength that may be configured based on a relationship (e.g., a ratio, etc.) between the presentation FOV and the capture FOV. In one or more implementations, the transformation may be configured to convert source image from one curvature (e.g., capture curvature) to target curvature based on source FOV and presentation FOV.

Figure 1A:
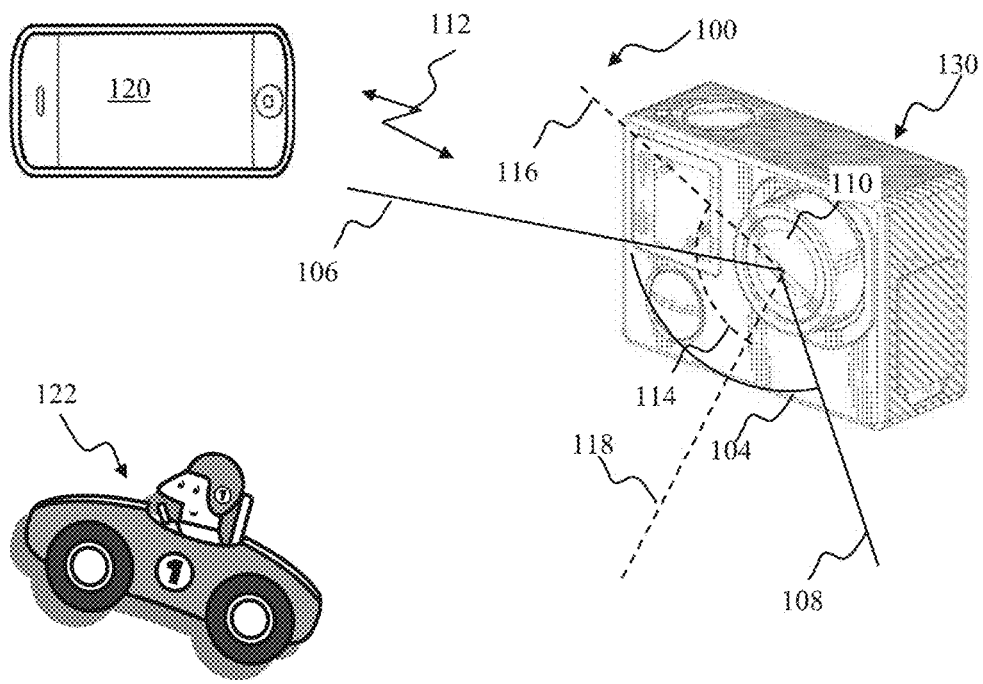
FIG. 1A is a graphical illustration depicting field of view of a capture device, in accordance with one implementation.

FIG. 1A illustrates configuration of a field of view of a capture apparatus configured to capture imaging content for an activity, in accordance with one implementation. The system 100 of FIG. 1A may include a capture apparatus 130, e.g., such as GoPro action camera, e.g., HERO4 Silver, HERO 4 Session, and/or other capture device. In some implementations, the capture apparatus 130 may comprise a video camera device, such as described in, e.g., U.S. patent application Ser. No. 14/920,427 entitled "APPARATUS AND METHODS FOR EMBEDDING METADATA INTO VIDEO STREAM" filed on 22 Oct. 2015, the foregoing being incorporated herein by reference in its entirety. The capture apparatus 130 may include one or more optical components 110 that may include by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fish-eye lens, infrared lens, ultraviolet lens, perspective control lens, other lens, and/or other optical element. The optical element 110 may be optically coupled to an imaging sensor. In some implementations, the capture device may include two optical components (e.g., including a lens and imaging sensors) that are disposed in a Janus configuration, e.g., back to back such as described in U.S. patent application Ser. No. 29/548,661, entitled "MULTI-LENS CAMERA" filed on 15 Dec. 2015, the foregoing being incorporated herein by reference in its entirety.

The capture apparatus 130 may be configured to obtain imaging content (e.g., images and/or video) over a field of view that may include one or more objects, e.g., 122 in FIG. 1A. In some implementations, the capture device may be configured to obtain imaging content for 180°×360° field of view. Content acquired with such field of view may be referred to as panoramic or spherical content, e.g., as described in U.S. patent application Ser. No. 14/949,786, entitled "APPARATUS AND METHODS FOR IMAGE ALIGNMENT" filed on 23 Nov. 2015, and/or U.S. patent application Ser. No. 14/927,343, entitled "APPARATUS AND METHODS FOR ROLLING SHUTTER COMPENSATION FOR MULTI-CAMERA SYSTEMS", filed 29 Oct. 2015, each of the foregoing being incorporated herein by reference in its entirety.

As used herein, term field of view (FOV) may be used to describe angle of view of an optical component (e.g., lens and imaging sensor). If a rectangular imaging sensor is used, the FOV may refer to a horizontal, vertical, and/or diagonal angular measurement unless specified otherwise. Term field of view at capture and/or capture field of view (FOV_C) may be used to describe view angle of image capture device (e.g., camera lens and sensor). Term field of view at presentation and/or viewing field of view (FOV_P) may be used to describe view angle of user viewing imaging content on a display device.

The capture apparatus 130 may be characterized longitudinal and latitudinal field of view, denoted by curves 104, 114 respectively. In some implementations wherein the capture apparatus 130 may be disposed with longer dimension being horizontal, the longitudinal FOV_C may correspond to horizontal FOV_C; the latitudinal FOV_C may correspond to vertical FOV_C. In one or more implementations, FOV_C 104 of apparatus 130 may be configured at 1200; FOV_C 114 may be configured at 900. Lines 108, 106, 118, 116 in FIG. 1A denote extents of the longitudinal and latitudinal FOV_C, respectively.

In some implementations, the optical element 110 may include a lens that may be characterized by what is referred to as fish-eye pattern and produce images characterized by fish-eye (or near-fish-eye) field of view (FOV). Various fish-eye lens curvatures may be utilizes, e.g., such as equidistant fisheye, stereographic fish-eye, orthographic fisheye, equisolid fish-eye, e.g., as expressed by Eqn. 1, Eqn. 2, Eqn. 3, Eqn. 4, respectively. In Eqn. 1, Eqn. 2, Eqn. 3, Eqn. 4, theta denotes the angle in rad between a point in the real world and the optical axis, which goes from the center of the image through the center of the lens, f is the focal length of the lens and R is radial position of a point on the image on the film or sensor. It will be recognized by those skilled in the arts that various other wide angle of view/field of view lens implementations may be utilized. In some implementations, optical element of a capture apparatus (e.g., 130) may be characterized by a curvature that may be expressed as a polynomial.

$$\text{Equidistant fisheye } R \sim f \times (\text{theta}) \tag{Eqn. 1}$$

$$\text{Stereographic } R \sim 2 \times f \times \tan(\text{theta}/2) \tag{Eqn. 2}$$

$$\text{Orthographic } R \sim f \times \sin(\text{theta}) \tag{Eqn. 3}$$

$$\text{Equidisolid } R \sim 2 \times f \times \sin(\text{theta}/2) \tag{Eqn. 4}$$

The capture apparatus 130 may house one or more internal metadata sources, e.g., video, inertial measurement unit, global positioning system (GPS) receiver component and/or other metadata source. In some implementations, the capture apparatus 130 may comprise a device described in detail in U.S. patent application Ser. No. 14/920,427, entitled "APPARATUS AND METHODS FOR EMBEDDING METADATA INTO VIDEO STREAM" filed on 22 Oct. 2015, incorporated supra.

The capture apparatus 130 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensor. The capture apparatus 130 may include one or more microphones configured to provide audio information that may be associated with images being acquired by the image sensor.

The capture apparatus 130 may be interfaced to an external metadata source (e.g., GPS receiver, cycling computer, metadata puck, and/or other device configured to provide information related to system 100 and/or its environment) via a remote link. In one or more implementations, the remote link may utilize any practical wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the remote link may be effectuated using a wired interface, e.g., HDMI, USB, digital video interface, display port interface (e.g., digital display interface developed by the Video Electronics Standards Association (VESA), Ethernet, Thunderbolt), and/or other interface.

The capture apparatus 130 may interface to an external user interface device 120 via a remote connection 112. In some implementations, the user interface device 120 may correspond to a smartphone, a tablet computer, a phablet, a smart watch, a portable computer, and/or other device configured to receive user input and communicate information with the capture apparatus 130. In one or more implementations, the remote 112 connection to the user interface device may be configured to utilize any practical wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the remote connection 112 may be effectuated using a wired interface, e.g., HDMI, USB, digital video interface, display port interface (e.g., digital display interface developed by the Video Electronics Standards Association (VESA), Ethernet, Thunderbolt), and/or other interface.

The metadata obtained by the capture apparatus 130 may be incorporated into the combined multimedia stream using any applicable methodologies including those described in U.S. patent application Ser. No. 14/920,427 entitled "APPARATUS AND METHODS FOR EMBEDDING METADATA INTO VIDEO STREAM" filed on 22 Oct. 2015, incorporated supra. In some implementations, the combined multimedia stream may include information related to the optical element of the capture device (e.g., polynomial coefficients describing curvature of the element 110). Lens characteristics (e.g., curvature) may be obtained during manufacturing of the element 110 and/or apparatus 130. In some implementations, the lens element may be characterized on a per unit basis (e.g., individual units characterized by a given set of coefficients); in one or more implementations, the lens element may be characterized on a nominal per-model basis (e.g., one set of coefficients covering all units of a given model/design).

The user interface device 120 may operate a software application (e.g., GoPro Studio, GoPro App, and/or other application) configured to perform a variety of operations related to camera configuration, control of video acquisition, and/or display of video captured by the capture apparatus 130. An application (e.g., GoPro App) may enable a user to create short video clips and share clips to a cloud service (e.g., Instagram, Facebook, YouTube, Dropbox); perform full remote control of apparatus 130 functions, live preview video being captured for shot framing, mark key moments while recording (e.g., with HiLight Tag, View HiLight Tags in GoPro Camera Roll) for location and/or playback of video highlights, wirelessly control camera software, and/or perform other functions. Various methodologies may be utilized for configuring the capture apparatus 130 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of an illustration, the user interface device 120 may receive user setting characterizing image resolution (e.g., 3840 pixels by 2160 pixels), frame rate (e.g., 60 frames per second (fps)), and/or other settings (e.g., location)

related to the activity (e.g., mountain biking) being captured. The user interface device 120 may communicate the settings to the capture apparatus 130.

A user may utilize the user interface device 120 to view content acquired by the capture apparatus 130. Display of the user interface device 120 may be characterized by longitudinal (horizontal) and latitudinal (vertical) dimensions. In some implementations, wherein the user interface device 120 may correspond to a smartphone, screen dimensions may be configured as about 90 mm by 50 mm, 104 mm×59 mm, 122 mm×68 mm. Content viewing on the user interface device 120 by a user may be characterized by a viewing distance. Viewing distance may be between 200 mm and 600 mm, 300 mm in some implementations. Viewing distance and presentation FOV are discussed in further detail with respect to FIGS. 2A-3.

In some implementations, the capture apparatus 130 may include a display configured to provide information related to camera operation mode (e.g., image resolution, frame rate, capture mode (sensor, video, photo), connection status (connected, wireless, wired connection), power mode (e.g., standby, sensor mode, video mode), information related to metadata sources (e.g., heart rate, GPS), and/or other information. The capture apparatus 130 may include a user interface component (e.g., one or more buttons) configured to enable user to start, stop, pause, resume sensor and/or content capture. User commands may be encoded using a variety of approaches including but not limited to duration of button press (pulse width modulation), number of button presses (pulse code modulation) and/or a combination thereof. By way of an illustration, two short button presses may initiate sensor acquisition mode described in detail elsewhere; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

Figure 1B:
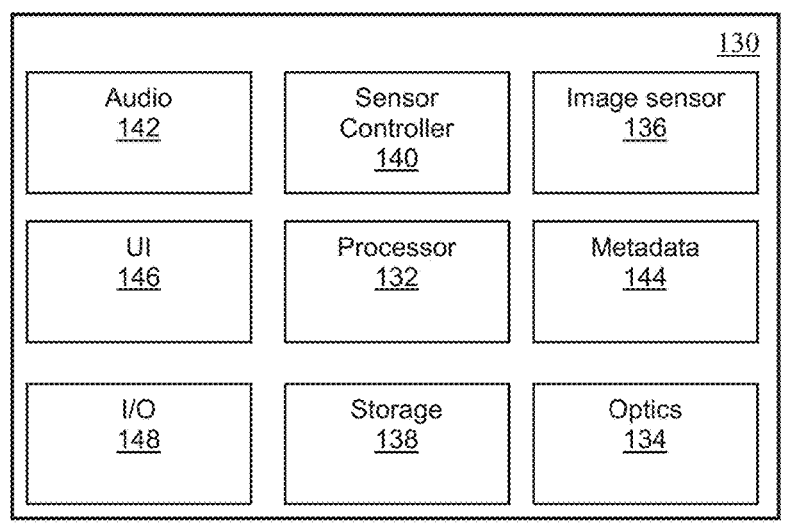
FIG. 1B is a functional block diagram illustrating a capture device used for content capture in, e.g., system of FIG. 1A in accordance with one implementation.

FIG. 1B illustrates one implementation of the capture apparatus 130 configured for collecting content and/or metadata. The capture apparatus 130 may include one or more processors 132 (such as system on a chip (SOC), microcontroller, microprocessor, CPU, DSP, ASIC, GPU, and/or other processors) that control the operation and functionality of the capture apparatus 130. In some implementations, the capture apparatus 130 in FIG. 1B may correspond to an activity camera configured to capture photo, video and/or audio content.

The capture apparatus 130 may include an optics module 134. In one or more implementations, the optics module 134 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fish-eye lens, infrared lens, ultraviolet lens, perspective control lens, other lens, and/or other optics component. In some implementations the optics module 134 may implement focus controller functionality configured to control the operation and configuration of the camera lens. The optics module 134 may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxide-semiconductor sensor, and/or other image sensor. The image sensor 136 may be configured to capture light waves gathered by the optics module 134 and to produce image(s) data based on control signals from the sensor controller 140. Optics module 134 may comprise focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 136 may include without limitation, video, audio, capacitive, radio, vibrational, ultrasonic, infrared sensors, radar, LIDAR and/or sonar, and/or other sensory devices.

The capture apparatus 130 may include one or more audio components (e.g., microphone(s) embodied within the camera (e.g., 142)). Microphones may provide audio content information.

The capture apparatus 130 may include a sensor controller module 140. The module 140 may be used to operate the image sensor 136. The controller may receive image or video input from the image sensor 136; audio information from one or more microphones, such as 142. In some implementations, audio information may be encoded using e.g., AAC, AC3, MP3, linear PCM, MPEG-H and or other audio coding format (audio codec). In one or more implementations of spherical video and/or audio, the audio codec may comprise a 3-dimensional audio codec, e.g., Ambisonics.

The capture apparatus 130 may include one or more metadata modules embodied (e.g., 144) within the camera housing and/or disposed externally to the camera. The processor 132 may interface to the sensor controller and/or one or more metadata modules 144. Metadata module 144 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other sensors. The capture apparatus 130 may contain one or more other metadata/telemetry sources, e.g., image sensor parameters, battery monitor, storage parameters, and/or other information related to camera operation and/or capture of content. Metadata module 144 may obtain information related to environment of the capture device and aspect in which the content is captured. By way of a non-limiting example, an accelerometer may provide device motion information, comprising velocity and/or acceleration vectors representative of motion of the capture apparatus 130; the gyroscope may provide orientation information describing the orientation of the capture apparatus 130, the GPS sensor may provide GPS coordinates, time, identifying the location of the capture apparatus 130; and the altimeter may obtain the altitude of the capture apparatus 130. In some implementations, internal metadata module 144 may be rigidly coupled to the capture apparatus 130 housing such that any motion, orientation or change in location experienced by the capture apparatus 130 is also experienced by the sensors of metadata module 144. The sensor controller 140 and/or processor 132 may be operable to synchronize various types of information received from the metadata sources. For example, timing information may be associated with the sensor data. Using the timing information metadata information may be related to content (photo/video) captured by the image sensor 136. In some implementations, the metadata capture may be decoupled form video/image capture. That is, metadata may be stored before, after, and in-between one or more video clips and/or images. In one or more implementations, the sensor controller 140 and/or the processor 132 may perform operations on the received metadata to generate additional metadata information. For example, the microcontroller may integrate the received acceleration information to determine the velocity profile of the capture apparatus 130 during the recording of a video. In some implementations, video information may consist of multiple frames of pixels using any applicable encoding method (e.g., H262, H.264, H.265, Cineform and/or other standard).

The capture apparatus 130 may include electronic storage 138. The electronic storage 138 may comprise a system memory module is configured to store executable computer instructions that, when executed by the processor 132, perform various camera functionalities including those described herein. The electronic storage 138 may comprise storage memory configured to store content (e.g., metadata, images, audio) captured by the capture apparatus 130.

The electronic storage 138 may include non-transitory memory configured to store configuration information and/or processing code configured to enable, e.g., video information, metadata capture and/or to produce a multimedia stream comprised of, e.g., a video track and metadata in accordance with the methodology of the present disclosure. In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the capture apparatus 130. The processing module 132 may interface to the sensor controller 140 in order to obtain and process sensory information for, e.g., object detection, face tracking, stereo vision, and/or other tasks.

The processing component 132 may interface with the mechanical, electrical sensory, power, and user interface 146 modules via driver interfaces and/or software abstraction layers. Additional processing and memory capacity may be used to support these processes. It will be appreciated that these components may be fully controlled by the processing module 132. In some implementation, one or more components may be operable by one or more other control processes (e.g., a GPS receiver may comprise a processing apparatus configured to provide position and/or motion information to the processor 132 in accordance with a given schedule (e.g., values of latitude, longitude, and elevation at 10 Hz)).

The memory and processing capacity may aid in management of processing configuration (e.g., loading, replacement), operations during a startup, and/or other operations. Consistent with the present disclosure, the various components of the system may be remotely disposed from one another, and/or aggregated. For example, one or more sensor components may be disposed distal from the capture device, e.g., such as shown and describe with respect to FIG. 1A. Multiple mechanical, sensory, or electrical units may be controlled by a learning apparatus via network/radio connectivity.

The capture apparatus 130 may include user interface (UI) module 146. The UI module 146 may comprise virtually any type of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (LED), speaker, and/or other UI elements. The UI module 146 may be operable to receive user input and/or provide information to a user related to operation of the capture apparatus 130.

The capture apparatus 130 may include an input/output (I/O) interface module 148. The I/O interface module 148 may be configured to synchronize the capture apparatus 130 with other cameras and/or with other external devices, such as a remote control, a second capture apparatus 130, a smartphone, a user interface device 120 of FIG. 1A and/or a video server. The I/O interface module 148 may be configured to communicate information to/from various I/O components. In some implementations the I/O interface module 148 may comprise a wired and/or wireless communications interface (e.g. WiFi, Bluetooth, USB, HDMI, Wireless USB, Near Field Communication (NFC), Ethernet, a radio frequency transceiver, and/or other interfaces) configured to communicate to one or more external devices (e.g., devices 124, 122, 120 in FIG. 1A and/or metadata source). In some implementations, the I/O interface module 148 may interface with LED lights, a display, a button, a microphone, speakers, and/or other I/O components. In one or more implementations, the I/O interface module 148 may interface to energy source, e.g., battery and/or DC electrical source. The communications interface of the capture apparatus 130 may include one or more connections to external computerized devices to allow for, inter alia, configuration and/or management of remote devices e.g., as described above with respect to FIG. 1A and/or with respect to FIGS. 2A-2B. The connections may include any of the wireless or wireline interfaces discussed above, and further may include customized or proprietary connections for specific applications. In some implementations, the communications interface may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the capture device (e.g., 110 in FIG. 1A) and a remote device (e.g., 120 in FIG. 1A).

The capture apparatus 130 may include a power system that may be tailored to the needs of the application of the device. For example, for a small-sized lower power action camera, a wireless power solution (e.g. battery, solar cell, inductive (contactless) power source, rectification, and/or other) may be used.

When presenting content obtained with a wide angle image capture device (e.g., capture apparatus 130 of FIG. 1A) content images may be adapted (e.g., transformed) for a given presentation FOV_P. Presentation FOV may be determined using a trigonometric relationship between dimensions of a display (e.g., width) and viewing distance.

In some implementations, display dimensions and/or viewing distance may be pre-configured. By way of an illustration, when setting up home theater, a user may specify display size, and/or typical viewing distance. In some implementations display dimensions may be deduced from model of the display device: e.g., Panasonic TC65CX400 model may be decoded into 65 inch display size; iPhone 5S screen size may be obtained from a depository (e.g., a list and/or a table). In one or more implementations, display size may be obtained as a part of a session between the display device (e.g., 336 in FIG. 3 and/or 962 in FIG. 9B) and content provision entity (e.g., apparatus 332 in FIG. 3 and/or 942 in FIG. 9B). In some implementations, display size may be obtained as a part of configuration of the display device, e.g., using methods of operating system, e.g., getDrawableForDensity (int id, int density), DisplayMetrics( ).

FIG. 2A illustrates presentation field view for some implementations of content display. Configuration 200 may illustrate viewing of content by a user 202 on a portable device 210 (e.g., smartphone). Arrow 204 denotes viewing distance (e.g., between 200 and 750 mm, 400 mm in some implementations). Curve 206 denotes longitudinal FOV_P. Configuration 220 in FIG. 2A may illustrate viewing of content by a user on a HDTV 230. Arrow 224 denotes viewing distance (e.g., between 1 m and 3 m in some implementations). Curve 226 denotes longitudinal FOV_P. Configuration 240 in FIG. 2A may illustrate viewing of content by a user on a personal computer monitor 250. Arrow 244 denotes viewing distance (e.g., between 0.3 m and 1 m in some implementations). Curve 246 denotes longitudinal FOV_P. Table 1 (below) illustrates several exemplary FOV_P.

In some implementations, the viewing distance may be determined using sensor information. FIG. 2B illustrates determination of a viewing distance using sensor information. A display device 310 of FIG. 2B may include a sensor 312, such as ultrasonic proximity sensor, structured light sensor, and/or other sensor. The sensor 312 may irradiate environment using pressure and/or electromagnetic waves, depicted by solid curves 314 in FIG. 2B. In some implementations, wherein the sensor 312 may include structured light sensor, the waves 314 may include projected light patterns that may be generated using laser interference and/or projection methodology. The sensor 312 may include a detector component that may detect waves 316 scattered and/or reflected from an object (e.g., viewer 202). The sensor component may be configured to evaluate transmitted and/or received patterns to determine, distance to objects, e.g., distance 304 to the viewer 202. In one or more implementations wherein the display device may include a smartphone, a laptop, a tablet computer and/or other device, featuring a rear facing camera, the sensor 312 may correspond to the rear facing camera. The waveforms 316 may correspond to light waves reflected from one or more objects (e.g., user). The display device may be configured to utilize the rear facing camera and evaluate dimensions of viewer representation within received image. Using expected/nominal size of human head, distance to the viewer (304) may be obtained. It will be recognized by those skilled in the arts that various means for determining viewing distance may be employed, e.g., use signal strength of signals communicated by TV remote control (e.g., lower signal level received by, e.g., TV may correspond to longer distance to the viewer), an object detection device disposed remote from the viewer and/or display device (e.g., Kinect™ device), and/or other device. In some implementations, the sensor may include an IR configured to determine the object shape, size, and distance. Viewing FOV may be determined using obtained viewing distance and display dimensions. Table 1 lists some exemplary FOV obtained on viewing distances and screen dimensions.

TABLE 1

| Device | Screen Width inch | Screen Width mm | Typical View dist. inch | Typical View dist. mm | Horiz FOV |
|---|---|---|---|---|---|
| phone | 4 | 90 | 15 | 381 | 15 |
| HDTV | 48 | 1219 | 120 | 3048 | 23 |

TABLE 1-continued

| Device | Screen Width inch | Screen Width mm | Typical View dist. inch | Typical View dist. mm | Horiz FOV |
|---|---|---|---|---|---|
| VR/AR goggles | 6 | 135 | 1 | 25 | 159 |
| iPad | 8 | 195 | 18 | 457 | 24 |
| iPad mini | 6 | 159 | 10 | 254 | 35 |
| laptop | 12 | 305 | 18 | 457 | 37 |
| PC | 24 | 610 | 30 | 762 | 44 |
| Cinema | 600 | 15240 | 600 | 15240 | 53 |
| Cinema (front row) | 600 | 15240 | 250 | 6350 | 100 |
| Projector | 100 | 2540 | 72 | 1829 | 70 |
| Projector | 100 | 2540 | 120 | 3048 | 45 |
| IMAX | 866 | 22000 | 600 | 15240 | 72 |
| IMAX (front row) | 866 | 22000 | 250 | 6350 | 120 |

FIG. 3 illustrates a system for providing content in accordance with methodology of the present disclosure. The system 330 may include a content provision entity 332 and a content display device 336. The content provision entity 332 may include a web content depository (e.g., YouTube, Facebook, and/or other), content streaming service (Netflix, Amazon, GoPro Channel, and/or other), a cable television note, a set-top box, a network attached storage (NAS), a portable storage (e.g., flash memory), a cloud storage, a server, a personal computer, a digital video recorder (DVR), and/or other content source. The content display 336 may include one or more of a portable device (e.g., smartphone, a digital camera, a laptop, a tablet computer), a desktop computer, a smart TV, a gaming console, a video projection device, and/or other device configured to display image content. The content display 336 may communicate with the content provision entity via one an electronic communications interface 334. The interface 334 may include one or more wired interfaces (e.g., serial, USB, Thunderbolt™, HDMI, Ethernet, and/or other wired interfaces) and/or wireless interfaces (e.g., WiFi, Bluetooth, cellular, and/or other interfaces). For example, such electronic communication links may be established, at least in part, via one or more networks. In some implementations, a network may comprise the Internet and/or may employ other communications technologies and/or protocols. By way of non-limiting example, the interface 334 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, the interface 334 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

The content display device 336 may request content via the interface 334. In some implementations, the content provision entity 332 may be configured to store imaging content using FOV at capture, e.g., FOV_C of the capture apparatus 130 of FIG. 1A. The imaging content may include information related to curvature of the lens used to capture content, e.g., using metadata track and/or session container, e.g., such as described in U.S. patent application Ser. No. 15/001,038 entitled "METADATA CAPTURE APPARATUS AND METHODS" filed on 19 Jan. 2016, the foregoing being incorporated herein by reference in its entirety. Lens curvature information may be used to obtain FOC_C.

Content display device 336 may be configured to transform images of the content in accordance with FOV_P using methodology of the disclosure. In some implementations the transformation may include curve to rectilinear transformation configured as follow:

$$\text{output} = \text{Curve2Rectilinear}(\text{input}, \text{strength}); \quad \text{(Eqn. 5)}$$

$$\text{where strength} = S(\text{FOV\_P}/\text{FOV\_C}); \quad \text{(Eqn. 6)}$$

In some implementations, image transformation may be configured in a generalized form as follows:

$$\text{output} = \text{CurvatureTransformation}(\text{input}, \text{strength}); \quad \text{(Eqn. 7)}$$

$$\text{where strength} = S(\text{Target\_FOV}, \text{Input\_FOV}); \quad \text{(Eqn. 8)}$$

where, CurvatureTransformation is a transformation configured to transform curvature of input image based on a strength parameter; the strength parameter may be configured based on input image FOV and target FOV.

Using transformation of Eqn. 5-Eqn. 6 and/or Eqn. 7-Eqn. 8 content obtained at wide FOV (e.g., greater than 90°) may be projected for narrower FOV (e.g., less than 60° in some implementations) displays using less curvature compared to solutions of the prior art. Configuring the image transformation in accordance with the viewing distance may enable obtaining images with less distortion and/or provide greater user experience compared to existing solutions. As may be seen from Eqn. 5-Eqn. 6, when viewing field of view matches capture field of view the transformation comprises curve-to-rectilinear transformation operation.

In some implementations, transformation of Eqn. 5-Eqn. 6 and/or Eqn. 7-Eqn. 8 may be used to obtain images characterized by greater curvature when viewing FOV is substantially smaller (e.g., less than 30%) of the capture FOV. Using the transformation of Eqn. 5-Eqn. 6 image curvature may be reduced as the viewer FOV approaches the capture FOV (FOV_P increases). The output of the transformation may provide a rectilinear image when the presentation FOV matches the capture FOV. In some implementations, a projection may be determined for FOV_P and/or FOV_C combination. In some implementations, such projection may be referred to as optimal or ideal projection for given FOV_P.

When viewing FOV is smaller (e.g., less than 60° in one implementation) compared to the capture FOV, curvature of the original image (e.g., fish-eye look) may be preserved for viewing. Producing an output image characterized by greater curvature (e.g., compared to rectilinear image) may aid in presentation of imaging content when the disparity between viewing FOV and capture FOV may be substantial (e.g., in excess 500 and/or 50%).

In some implementations, target curvature may be determined based on a given viewing FOV. Capture FOV and/or lens curvature may be configured based on one or more target viewing configurations. In one or more implementations, lens curvature may be configured based on widest target viewing FOV. By way of a non-limiting illustration, images captured with a lens with FOV_C of 120° may be transformed for viewing at view angles (FOV_P) between 10° and 110°; images captured with a lens with FOV)C of 160° may be transformed for viewing at view angles between 10° and 150° FOV_P.

In one implementation, imaging content may be captured using 120° lens and may be viewed at about 120° FOV (e.g., in the front row on an iMAX theater), the transformation Eqn. 5 Eqn. 6 and/or Eqn. 7-Eqn. 8 may be used to obtain an output image characterized by practically absent (or negligible) curvature. Operation of Eqn. 5 Eqn. 6 may be referred to as removing curvature from the source image when viewing FOV may be matching the capture FOV. It is noteworthy, that when the same image (e.g., captured using 120° lens) may be viewed at smaller FOV (e.g., such as listed in Table 1) the transformation Eqn. 5 Eqn. 6 may be used to obtain output imaged for one or more target viewing FOVs. In some implementations, the transformation Eqn. 7-Eqn. 8 may be used to adapt imaging content for viewing on a curved screen (e.g., iMAX, movie theater, curved HDTV).

Figure 10:
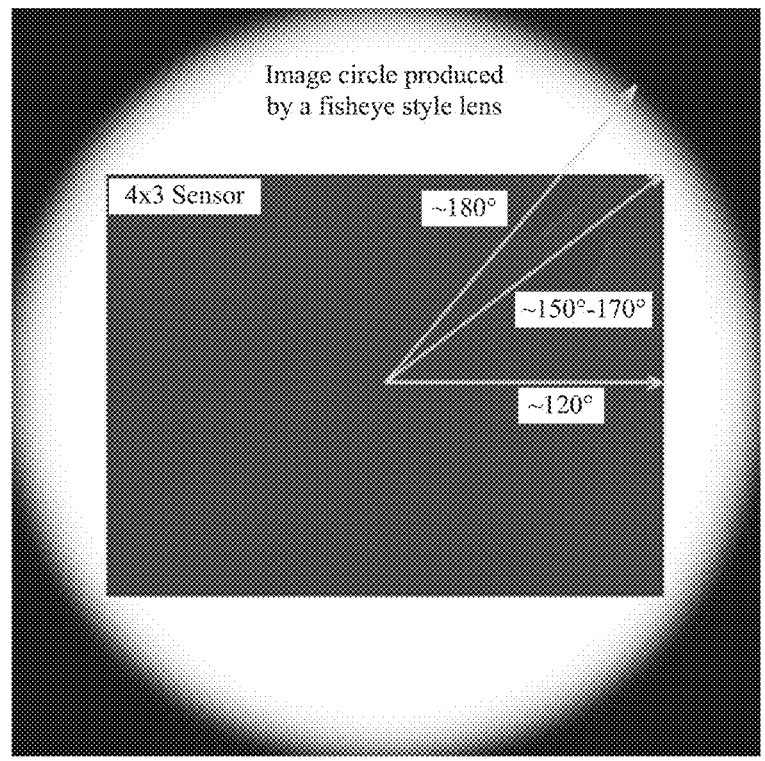
FIG. 10 illustrates lens and sensor configuration of an activity capture apparatus of, e.g., FIGS. 1A-1B, in accordance with some implementations.

FIG. 10 illustrates lens and sensor configuration of an activity capture apparatus of, e.g., FIGS. 1A-1B, in accordance with some implementations. In some implementations, a fish-eye lens of in combination with a 4×3 aspect ratio 10.5 mm (1/2.3-inch) imaging sensor used in capture devices may be configured to obtain 120° horizontal FOV; diagonal FOV may be between 150° and 170°. To obtain images with capture FOV in excess of 130° horizontally, multiple images obtained with multiple lenses may be stitched together. It will be recognized by those skilled in the arts that above values are exemplary and a variety of capture configurations may be utilized with the methodology of the disclosure. In some implementations, image transformation methodology described herein may be used to transform any imaging content (including previously transformed) for a target FOV.

Figure 11:
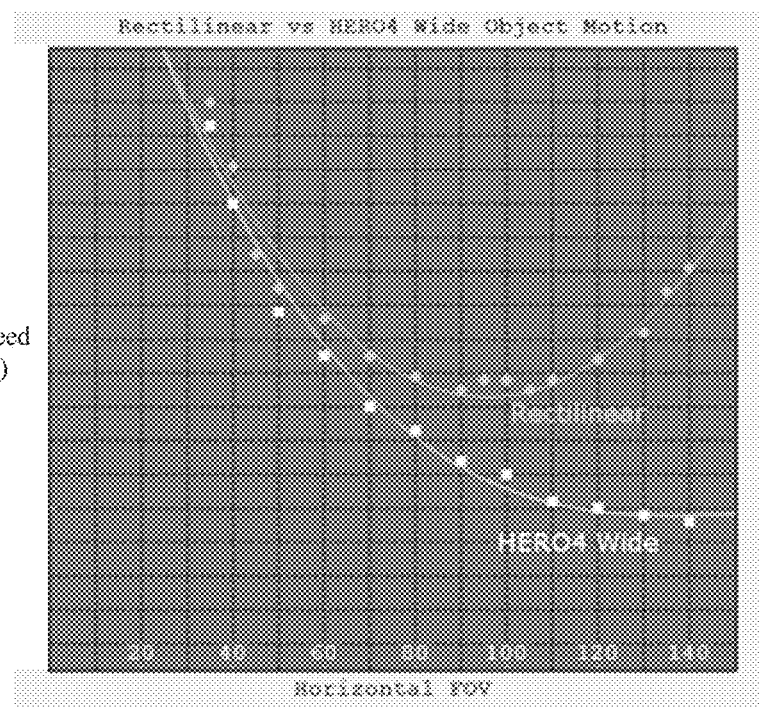
FIG. 11 is a plot depicting simulated image edge motion as a function of capture field of view in accordance with some implementations.

In some implementations, use of wide angle capture FOV may be configured to obtain imaging content with reduced apparent motion. Transformation of images from a wide FOV to a narrower presentation FOV may be used to reduce apparent motion, thereby obtaining motion stabilized video content compared to a rectilinear content and/or content captured with a narrow FOV. The transformation of, e.g., Eqn. 5-Eqn. 6 and/or Eqn. 7-Eqn. 8 may provide for video content wherein camera motion becomes more stable. Angle motion (camera shake and pans) may be less pronounced with a small viewer FOV. FIG. 11 presents image edge motion as a function of capture field of view in accordance with some implementations. In FIG. 11 curve denoted with solid rectangles represents stereographic fish-eye lens, curve denoted with diamonds represents rectilinear lens. As may be seen from data shown in FIG. 11, a fish-eye lens produces lower object motion for horizontal FOV of greater than about 60° compared to a rectilinear lens. In other words, for a fish-eye lens, the wider the lens FOV, the slower the object motion due to camera motion. Methodology of the disclosure may be utilized to reduce apparent object motion when capturing content from a moving platform (e.g., on-person camera, camera installed on a vehicle). Data presented in FIG. 11 characterize a narrow viewer FOV, where the edge speed dominate. For a larger viewer FOV, the center speed may increase slower. Utilizing image transformation based on the viewer FOV may enable provision of video content that may be matched (e.g., amount of curvature and/or object motion within the image) to viewing conditions thereby improving user viewing experience.

In some implementations, image transformation using, e.g., Eqn. 5-Eqn. 6 and/or Eqn. 7-Eqn. 8 may be effectuated by the content display device 336 as a part of content playback. Field of view of the playback may be determined using device screen size and viewing distance using any applicable methodologies including these described herein.

In one or more implementations, image transformation may be effectuated by the content provision entity 332 prior to or as a part of content delivery. Content provision entity 332 may be configured to request device type and/or screen size of the content display device 336. Nominal and/or measured viewing distance may be used to determine FOV_P. By way of an illustration, it may be determined that the content display device 336 corresponds to iPhone 5. Content provision entity 332 may access information related to iPhone 5 screen size (e.g., 90 mm by 50 mm) and typical viewing distance (e.g., 380 mm) thereby producing FOV_P of 15°. In some implementations the viewing distance and/or the viewing angle may be obtained during image viewing (e.g., in real time) such that the viewing distortion curve may be adapted in be varied during content presentation. For example, if the viewer is moving the iPhone screen closer to/farther from his eyes, the distortion curve may be varied in real-time to provide the best viewing experience. Images of the imaging content may be transformed by the content provision entity 332 using Eqn. 5-Eqn. 6 and/or Eqn. 7-Eqn. 8 prior to transmission via interface 334.

In one or more implementation, the content provision entity 332 may be configured for multiple versions of content. Individual versions may be encoded for a given resolution (e.g., 4K, HD, smartphone, and/or other image resolution) and/or given field of view. By way of a non-limiting illustration, HD content may be transformed to match expected HDTV FOV_P (e.g., 25°-35° in some implementations); content for display on smartphones and/or tablet devices may be encoded using 1280×720 resolution images transformed for expected FOV_P (e.g., between 15° and 25°, 20° in some implementations). In one or more implementations, display size of the content display device 336 may be provided to the content provision entity 332 as a part of a session between the display device and content provision entity. In one or more implementations, it may be beneficial to convert the capture distortion to multiple viewing distortion curve variations simultaneously before transcoding to different resolutions. The content for a given resolution may be transmitted based on the which device is requesting the video. One or more target transformations for a given device (e.g., such as given in Table 1) and view angle may be obtained beforehand (in the cloud) and stored as a look-up table (LUT), so the viewer may be provided with best viewing experience. In some implementations, display size may be obtained as a part of configuration of the display device, e.g., using methods of operating system, e.g., getDrawableForDensity (int id, int density), DisplayMetrics( ).

Figure 4:
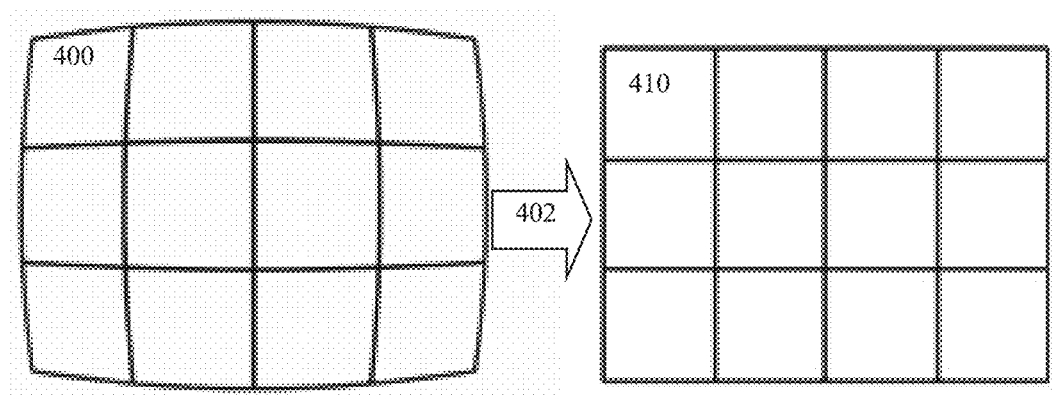
FIG. 4 is a plot depicting image transformation to rectilinear representation in accordance with one implementation.

FIG. 4 illustrates image transformation to rectilinear representation in accordance with one implementation. Panel 400 in FIG. 4 depicts an image in curved (e.g., fish-eye) representation; panel 410 depicts image in rectilinear representation. As may be seen from FIG. 4, transformation 402 may be configured to transform fish-eye image to rectilinear image, thereby reducing and/or altogether removing fish-eye image distortion.

Figure 5A:
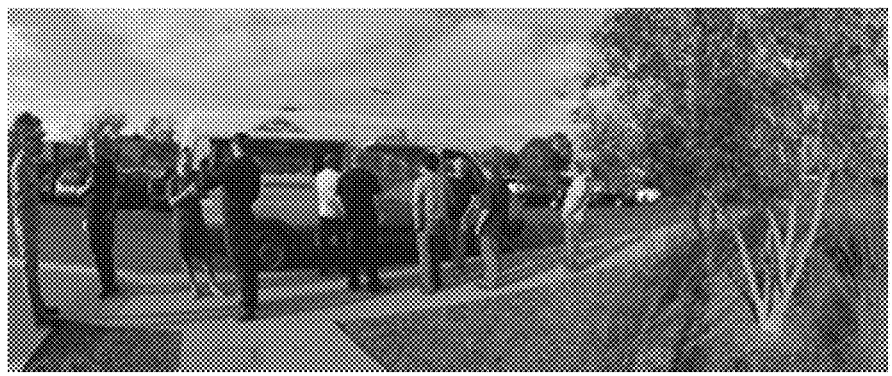
FIGS. 5A-5B are simulated images depicting distortion for different image representations in accordance with one implementation.
Figure 5B:
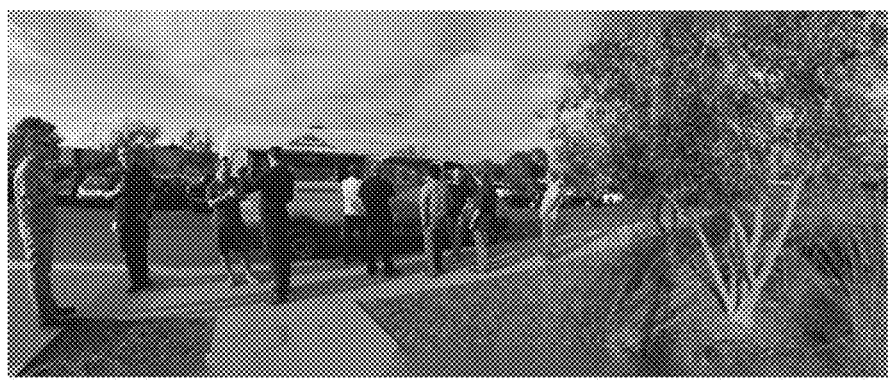

FIGS. 5A-5B present images depicting different image representations in accordance with one implementation. FIG. 5A illustrates an image obtained using equidistant "fish-eye" (e.g., of Eqn. 1) with 150° horizontal capture FOV. FIG. 5B illustrates output of the transformation operation of Eqn. 5, wherein the input image corresponds the image of FIG. 5A; the strength parameter of the transformation (e.g., described by Eqn. 6) is obtained for viewing FOV of 40° and 150° horizontal capture FOV. As may be seen from a comparison of images in FIGS. 5A-5B when viewed on a PC and/or a laptop (FOV_P and FOV_C do not match), objects in the original wide angle of view image may appear more distorted (e.g., squashed horizontally) near left/right edges of the image in FIG. 5A. The image of FIG. 5B that is adapted for viewing on a PC and/or a laptop (e.g., at viewing FOV of 40°) may appear less distorted.

FIGS. 6A-6F are simulated images depicting distortion for different image representations and presentation field of view, in accordance with some implementations. The images shown in FIGS. 6A-6F may include images that are shown at the edge of a screen (e.g., edge of a display). The perceived distortions may be due to projection (e.g., rectilinear, stereographic), placement of the object within the image, and/or other image characteristics. Images near the edge of a screen may be distorted more from the capture to presentation FOV mismatch. FIGS. 6D-6F present simulated images obtained using a stereographic fisheye lens curvature and projected for different observer positions (different FOV_P) as follows: FIG. 6D is configured to represent the image as viewed on a smartphone with 20° FOV_P; FIG. 6E is configured to represent the image as viewed in front of a movie theater, e.g., at about 60° FOV_P; FIG. 6F is configured to represent the image as viewed in front of an IMAX theater, e.g., at about 120° FOV_P. Images presented in FIGS. 6D-6F are produced without curvature transformation of the present disclosure.

Images of the top row (e.g., FIGS. 6A-6C) present images obtained with a rectilinear lens when viewed at different FOV_P as follows: FIG. 6A is configured to represent the image as viewed on a smartphone with 20° FOV_P; FIG. 6B is configured to represent the image as viewed in front of a movie theater, e.g., at about 60° FOV_P; FIG. 6C is configured to represent the image as viewed in front of an IMAX theater, e.g., at about 120° FOV_P.

In order to implement image transformation methodology of the disclosure the following methodology may be employed. During (or as a part of) image capture, information related to lens curvature may be obtained and stored with the content. In some implementations, lens curvature may be characterized by coefficients for a polynomial (e.g., second order, third order, or other order) used to describe camera lens. In some implementations, lens curvature information may be obtained from a lens information depository, (e.g., a table).

In some implementations of image content editing and/or summary generation, final edited images and/or video summary may be encoded using capture FOV; lens information (used in capture) may be embedded within the final video and/or images using, e.g., the metadata track such as described in detail in U.S. patent application Ser. No. 14/920,427 entitled "APPARATUS AND METHODS FOR EMBEDDING METADATA INTO VIDEO STREAM" filed on 22 Oct. 2015, incorporated supra and/or a container structure such as described in detail in U.S. patent application Ser. No. 15/001,038, entitled "METADATA CAPTURE APPARATUS AND METHODS" filed on 19 Jan. 2016, incorporated supra.

In some implementations of image content display on a client device, type of client device is determined. Client device type may be determined automatically. Display size of the client device may be determined. In some implementations, the display size determination may be configured based on a pre-configured depository relating device model (e.g., iPhone 6S) and display size. In one or more implementations, the display size may be obtained by the content playback application using an API of the device operating system (e.g., getDisplayMetrics( ).xdpi, method that may to return dpi of the device display).

Viewing FOV for the display of content may be determined based on device screen size for the device (e.g., 100 mm) and nominal viewing distance (e.g., 0.4 m). In some implementations, viewing distance may be determined as a part of content playback using sensor information, e.g. such as described above with respect to FIG. 2B. Content playback application may utilize FOV_P information to transform images of the content for the appropriate viewing FOV in accordance with, e.g., Eqn. 5-Eqn. 6 and/or Eqn. 7-Eqn. 8.

In some implementations, video content stored on at a content source (e.g., a server, a NAS, social media depository, e.g., YouTube) may be transformed for several typical viewing profiles (FOV), e.g., a phone, a tablet, a computer, a HDTV at one or more viewing distances, and/or other profile. Viewing FOV may be determined based on a nominal screen size for the device (e.g., 1.2 m for 48 inch HDTV, 100 mm for a phone) and nominal viewing distance (e.g., 1.8 m for the HDTV, 0.4 m for a phone). Multiple encoded versions of the content, configured for a target viewing FOV may be stored on the content source. During playback, a client device may request content. Type of the client device and/or viewing profile (e.g., FOV_P) may be determined. Client device type may be determined automatically and/or a user may be prompted to specify the type (e.g., tablet, PC, phone). Screen size of the client device may be determined using a model number, a database of devices, user provided information (e.g., during initial setup/registration), using API of an operating system. Viewing distance may be determined. In some implementations, the viewing distance device may be determined using a typical configuration (e.g., PC at 0.9 m), obtained using sensor information, e.g., such as described with respect to FIG. 2B, based on user provided information (e.g., during initial setup/registration), and/or other approaches. Viewing profile (e.g., FOV_P) may be determined. Version of the content transformed for the viewing profile (e.g., smartphone) may be provided.

Figure 7:
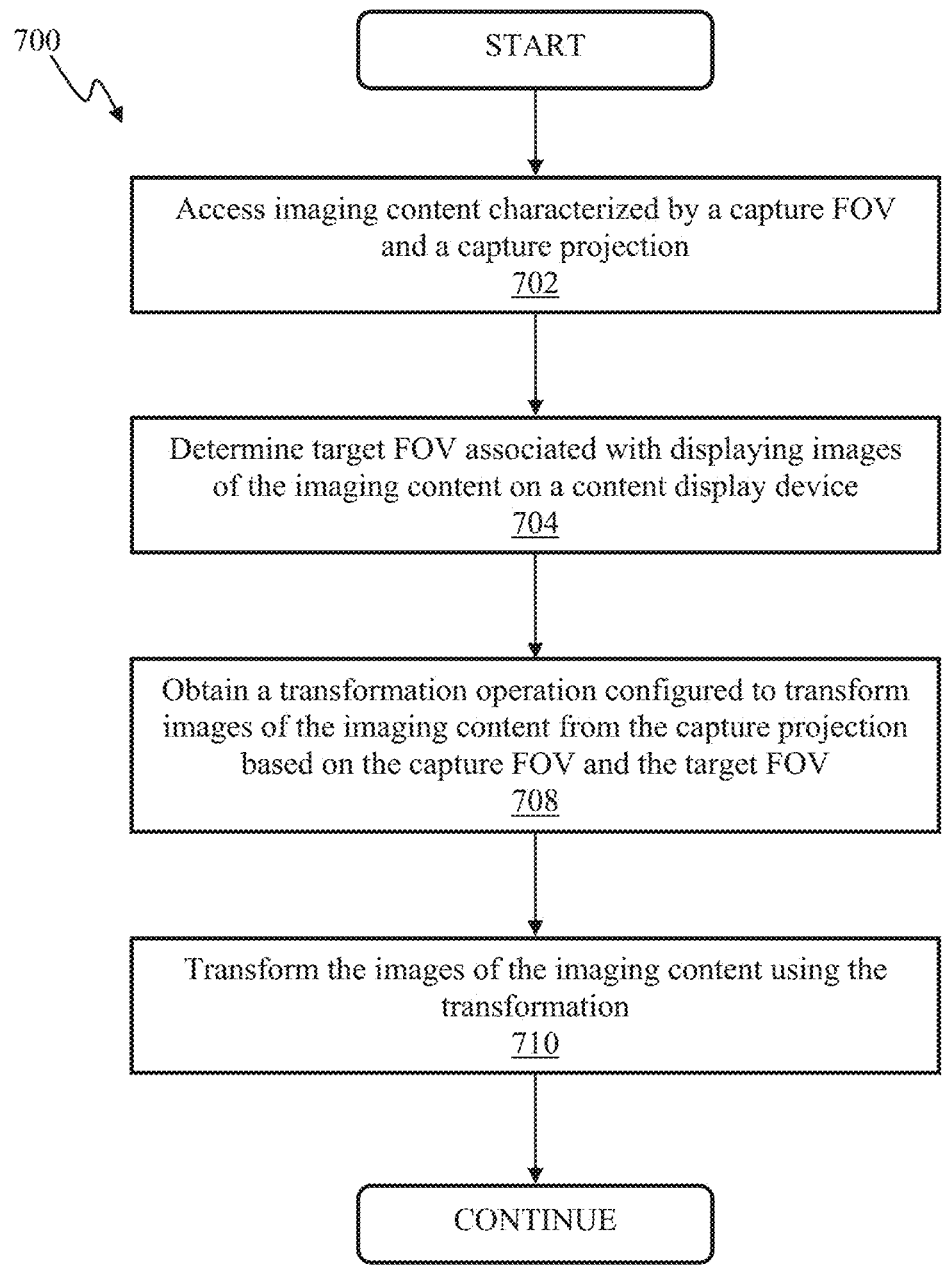
FIG. 7 is a logical flow diagram illustrating a method of image content presentation using image transformation methodology of the disclosure, in accordance with one implementation.
Figure 8A:
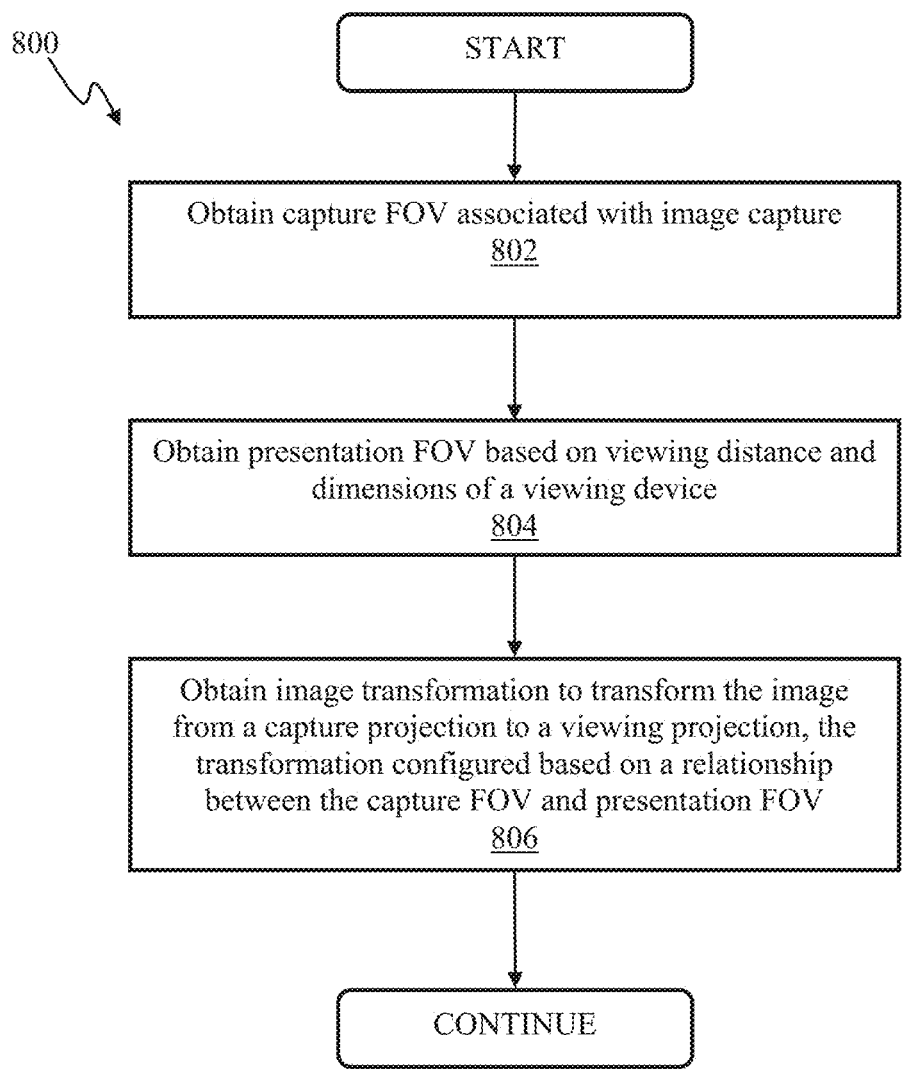
FIGS. 8A-8C are logical flow diagram illustrating methods for obtaining transformation of image content based on presentation field of view, in accordance with one implementation.
Figure 8B:
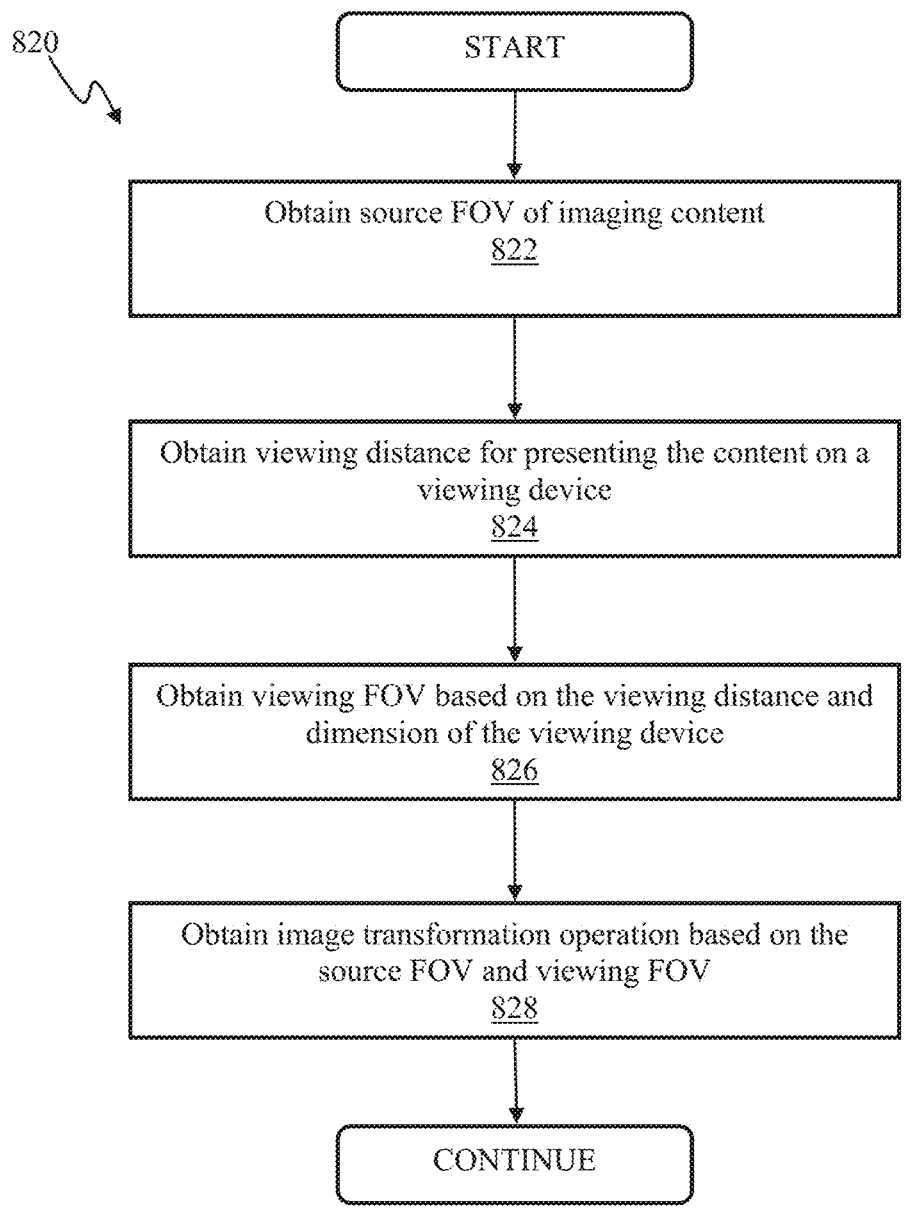
Figure 8C:
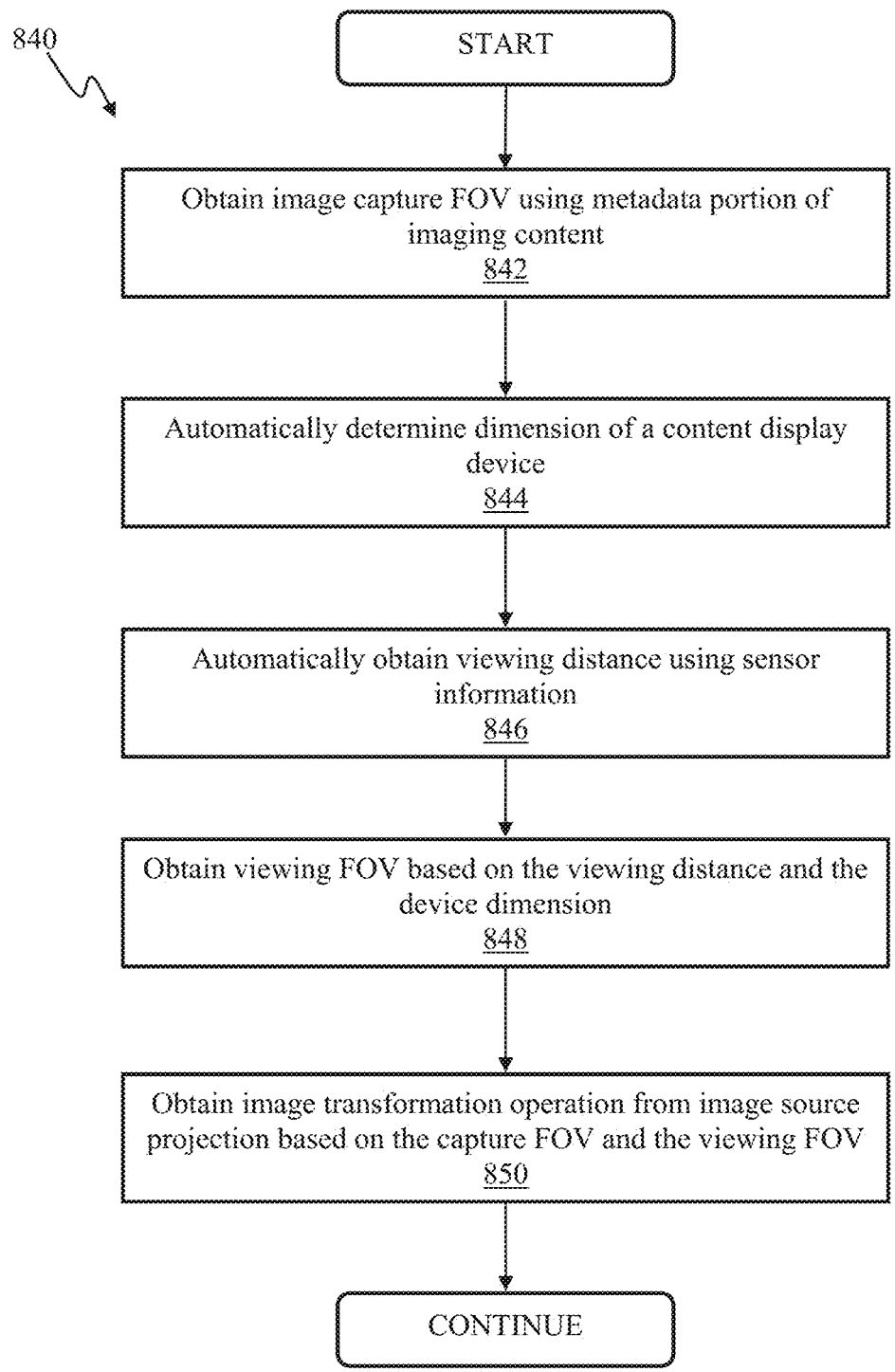

FIGS. 7-8C illustrate methods 700, 800, 820, 840 for image transformation for viewing field of view in accordance with some implementations of the present disclosure. The operations of methods 700, 800, 820, 840 presented below are intended to be illustrative. In some implementations, methods 700, 800, 820, 840 may be accomplished with one or more additional operations not described, and/or without one or more of the operations discussed. Additionally, the order in which the operations of methods 700, 800, 820, 840 are illustrated in FIGS. 7-8C and described below is not intended to be limiting.

In some implementations, methods 700, 800, 820, 840 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 700, 800, 820, 840 in response to instructions stored electronically on an electronic storage medium. The one or more processing devices may include one or more devices configured through hardware, firmware, and/or software to be specifically designed for execution of one or more of the operations of methods 700, 800, 820, 840. Operations of methods 700, 800, 820, 840 may be effectuated by one or more devices and/or computerized systems including these described with respect to FIGS. 1A-1B and/or FIGS. 9A-9B.

FIG. 7 illustrates a method of image content presentation using image transformation methodology of the disclosure, in accordance with one implementation. Method 700 of FIG. 7 may be implemented by, e.g., system 900 of FIG. 9A and/or apparatus 942 of FIG. 9B.

At operation 702 of method 700 imaging content may be accessed. In one or more implementations, the imaging content may include video, sequence of images (e.g., time-lapse and/or burst), and/or one or more individual images. Imaging content may be captured by a capture device (e.g., 130). The imaging content may be characterized by a capture FOV and a capture projection. In one or more implementations, the FOV_C may be configured between 60° and 360°; the capture projection may include a fish eye projection (e.g., of Eqn. 1, Eqn. 2, Eqn. 3, Eqn. 4 and/or other curved projection). In some implementations, methodology of the disclosure may be adapted for use with a curved display (e.g., a curved display smartphone, 4K TV, iMAX screen, movie theater screen, cylindrical display, spherical display, and/or other device). By way of an illustration, a curved screen may be configured to present content at more than 180° (e.g., FOV_P>180°); an imagining sphere and/or a cylinder may be configured to present content with 360 FOV_P. It is noteworthy that in the latter implementation the transformation of Eqn. 5 may be adapted to provide output images using a projection other than rectilinear (e.g., equirectangular) while adapting image curvature for capture and presentation FOV.

At operation 704 a target FOV may be determined. In some implementations, the target FOV may be associated with displaying images of the imaging content on a content display device, e.g., user interface device 120 of FIG. 1A, apparatus 902 of FIG. 9A, and/or device 962 of FIG. 9B. In one or more implementations, the target FOV may be determined in accordance with display dimensions of the display device and/or viewing distance. In one or more implementations, multiple target FOV may be determined e.g., in order to target multiple target viewing device (e.g., HDTV, smartphone, PC, tablet computer as shown and described with respect to FIG. 2A, and/or other configurations). In some implementations, multiple viewing configurations may be associated with a given display device (e.g., HDTV in a large room may be characterized by a narrower FOV_P (e.g., 250) while the same HDTV disposed in a smaller room (smaller viewing distance) may be characterized by a wider FOV_P (e.g., 40°).

At operation 708 a transformation operation may be obtained. In one or more implementations, the transformation operation may be configured to transform images of the imaging content from the capture projection to a target projection; the transformation operation may be obtained based on the capture FOV and the target FOV, e.g., using methodology of Eqn. 5-Eqn. 6 and/or Eqn. 7-Eqn. 8 described herein. In one or more implementations, multiple transformation operations (e.g., targeting multiple display devices and/or multiple viewing configurations) may be determined. By way of an illustration, a transformation may be determined for smartphone as the target viewing device, HDTV at a given distance as the target viewing configuration, a PC as the target viewing device, and/or other configurations.

At operation 710 source images of the imaging content may be transformed using the transformation obtained at operation 708. The transformation may be configured to obtain transformed version of the content configured for presentation at a given target display device and/or for a given viewing configuration. In some implementations, a given source image may be transformed using multiple transformations to obtain multiple versions of transformed content. By way of an illustration, a given source image may be transformed for viewing on a smartphone, a PC, an HDTV at one or more viewing distances and/or other configurations.

FIG. 8A illustrates a method for obtaining transformation of image content from capture projection to viewing projection, in accordance with one implementation.

At operation 802 of method 800 field of view associated with capture of one or more images may be obtained. In one or more implementations, the capture FOV may be obtained on evaluation of information associated with curvature of a lens used for capturing the one or more images. The curvature information may include coefficients of a polynomial and/or other polynomial representation (e.g., roots of a polynomial, ratio of polynomials). The lens curvature information may be stored using metadata, e.g., image EXIF, metadata track of a video container (e.g., MOV, MP4), metadata of session container, and/or other approaches. In some implementations, the FOV_C information may be stored using metadata of the content.

At operation 804 presentation FOV may be obtained based on the viewing distance and dimensions of a viewing device At operation 806 image transformation from capture projection to a viewing projection may be obtained. In some implementations, the transformation may be configured based on a relationship (e.g., a ratio, etc.) between the capture FOV and the presentation FOV. In one or more implementations the transformation may be configured to transform input image curvature to output image curvature based on the input image FOV and a target output FOV. In one or more implementations, a norm operation (e.g., L-2 norm and/or a higher order norm, and/or squared normalized ratio) may be utilized when configuring image transformation.

FIGS. 8B-8B illustrate methods for obtaining transformation of image content based on viewing distance, in accordance with one implementation.

At operation 822 source FOV of imaging content may be obtained.

At operation 824 viewing distance for presenting the content on a viewing device may be obtained.

At operation 826 viewing FOV may be obtained based on the viewing distance and dimension of the viewing device.

At operation 828 image transformation operation may be obtained based on the source FOV and viewing FOV.

At operation 842 of method 840 of FIG. 8C, image capture FOV of imaging content may be obtained using metadata portion of imaging content.

At operation 844 a dimension of a content display device may be automatically obtained.

At operation 846 viewing distance may be automatically obtained using sensor information. In some implementations, the viewing distance determination may be effectuated using methodology described with respect to FIG. 2B and/or FIG. 3

At operation 848 viewing FOV may be obtained based on the viewing distance and the device dimension At operation 850 image transformation operation from image source projection may be obtained based on the capture FOV and the viewing FOV. In some implementations, the transformation operation may be configured in accordance with Eqn. 5-Eqn. 6 and/or Eqn. 7-Eqn. 8 described herein.

Figure 9A:
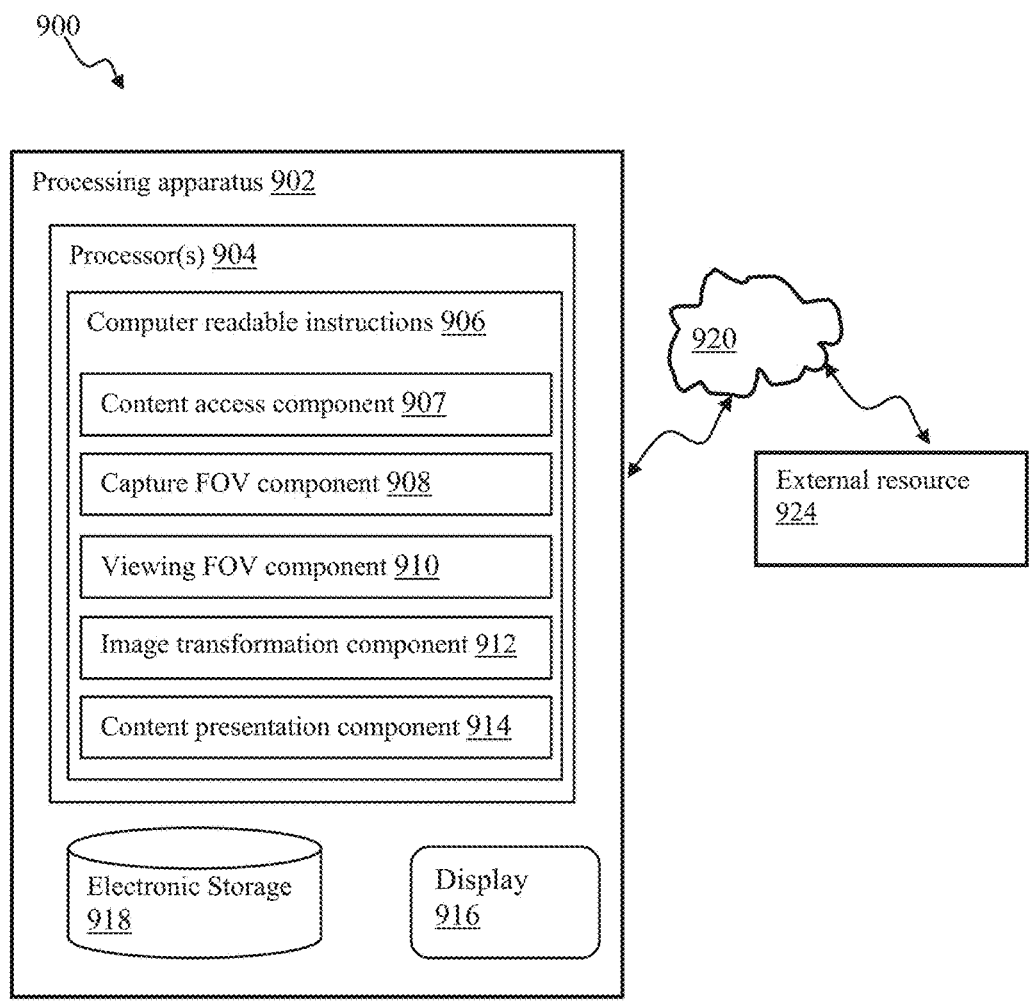
FIG. 9A is a functional block diagram illustrating a computerized content display system configured to implement image transformation methodology of the disclosure, in accordance with one implementation.

FIG. 9A illustrates a computerized system for transforming imaging content based on viewing field of view, in accordance with one implementation. In some implementations, the system 900 may be configured to provide encoded content during content acquisition by a capture device (e.g., 130 of FIG. 1A). In one or more implementations, the system 900 may be configured to provide the content using previously acquired content.

The system 900 of FIG. 9A may include a processing apparatus 902 coupled to an external resource 924 via interface 920. In some implementations, the external resource may include one or more of a network attached storage (NAS), a portable storage (e.g., flash memory), a capture device (e.g., 130 of FIGS. 1A-1B), a cloud storage, a server, a personal computer, a DVR, a set top box, a content delivery network node, and/or other storage implementation.

In some implementations, the apparatus 902 may correspond to a content display device including one or more of e.g., a smartphone, a digital camera, a laptop, a tablet computer, a desktop computer, a smart TV, a gaming console, a client computing platform, and/or other platforms, a capture device (e.g., a camera), and/or other device. In some implementations, the system 900 may include multiple capture devices, e.g., configured for obtaining panoramic content e.g., such as described in U.S. patent application Ser. No. 14/927,343 entitled "APPARATUS AND METHODS FOR ROLLING SHUTTER COMPENSATION FOR MULTI-CAMERA SYSTEMS" filed on 29 Oct. 2015, incorporated supra.

The interface 920 may include one or more wired interfaces (e.g., serial, USB, Thunderbolt™, HDMI, Ethernet, coaxial cable, and/or other wired interfaces) and/or wireless interfaces (e.g., WiFi, Bluetooth, cellular, and/or other interfaces). For example, such electronic communication links may be established, at least in part, via one or more networks. In some implementations, a network may comprise the Internet and/or may employ other communications technologies and/or protocols. By way of non-limiting example, the interface 920 may employ communication technologies including one or more of Ethernet, 802.11, worldwide interoperability for microwave access (Wi-MAX), 3G, Long Term Evolution (LTE), digital subscriber line (DSL), asynchronous transfer mode (ATM), InfiniBand, PCI Express Advanced Switching, and/or other communication technologies. By way of non-limiting example, the interface 920 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the interface 920 may be represented using formats including one or more of hypertext markup language (HTML), extensible markup language (XML), and/or other formats. One or more exchanges of information between entities of system 900 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 900 may use custom and/or dedicated data communications technologies instead of, or in addition to, the ones described above.

The apparatus 902 may include one or more physical processors 904 configured by machine-readable instructions 906 and/or other components. Executing the machine-readable instructions 906 may cause the one or more physical processors 904 to effectuate imaging content transformation using methodology of the disclosure. The machine-readable instructions 906 may include one or more of content access component 907, an capture FOV component 908, viewing FOV component 910, an image transformation component 912, a content presentation component 914, and/or other components.

One or more features and/or functions of the apparatus 902 may be facilitation of video content presentation and/or provision of content. It is noted that although the present disclosure is directed to videos and/or video clips, one or more other implementations of system 900 and/or apparatus 902 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The apparatus 902 may include communication lines or ports to enable the exchange of information with a network (e.g., 920) and/or other entities (e.g., 924). Illustration of apparatus 902 in FIG. 9A is not intended to be limiting. The apparatus 902 may include a plurality of hardware, software, and/or firmware components operating together to provide the functionality attributed herein to apparatus 902. For example, the apparatus 902 may be implemented by a cloud of computing platforms operating together as apparatus 902.

The apparatus 902 may include electronic storage 918. Electronic storage 918 may comprise electronic storage media that electronically stores information. The electronic storage media of electronic storage 918 may include one or both of system storage that is provided integrally (i.e., substantially non-removable) with apparatus 902 and/or removable storage that is removably connectable to apparatus 902 via, for example, a port or a drive. A port may include a USB port, a Firewire port, and/or other port. A drive may include a disk drive and/or other drive. Electronic storage 918 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 918 may include one or more virtual storage resources (e.g., cloud storage, a virtual private network, and/or other virtual storage resources). The electronic storage 918 may be configured to store software algorithms, information determined by processor(s) 904, information received from apparatus 902, information received from external resource(s), and/or other information that enables apparatus 902 to function as described herein.

The apparatus 902 may include display 916. Display 916 may include display only (e.g., HDTV), touch sensitive display, digital light projection device, VR headset, and/or other device configured to project and/or display images. Any applicable existing (e.g., light emitting diode displays, organic LED (OLED), Digital Light Processing (DLP), electronic paper, MEMS display, combination thereof, multi-monitor display), and/or future projection technology may be utilized for displaying content in accordance with methodology of the disclosure. Display 916 may be coupled to the processor(s) 904 using any applicable interface (e.g., a bus).

The system 900 may include an external resource(s) 924 operatively linked via one or more electronic communication links 920. External resource(s) 924 may include sources of information, hosts, and/or other entities outside of system 900, external entities participating with system 900, computing platforms, and/or other resources. In some implementations, some or all of the functionality attributed herein to system 900 may be provided by resources included in external resource 924.

It will be appreciated that this is not intended to be limiting and that the scope of this disclosure includes implementations in which apparatus 902, external resources 924, and/or other entities may be operatively linked via some other communication media.

Processor(s) 904 may be configured to provide information-processing capabilities in apparatus 902. As such, processor 904 may include one or more of a digital processor, an analog processor, a digital circuit designed to process information, an analog circuit designed to process information, a state machine, and/or other mechanisms for electronically processing information. Although processor 904 is shown in FIG. 9A as a single entity, this is for illustrative purposes only. In some implementations, processor 904 may include one or more processing units. These processing units may be physically located within a given device; the processor 904 may represent processing functionality of a plurality of devices operating in coordination. The processor 904 may be configured to execute components 907, 908, 910, 912, and/or 914. The processor 904 may be configured to execute components 907, 908, 910, 912, and/or 914 by software; hardware; firmware; some combination of software, hardware, and/or firmware; and/or other mechanisms for configuring processing capabilities on processor 904.

It should be appreciated that although components 907, 908, 910, 912, and/or 914 are illustrated in FIG. 9A as being co-located within a single processing unit, in implementations in which processor 904 includes multiple processing units, one or more of components 907, 908, 910, 912, and/or 914 may be located remotely from the other components. The description of the functionality provided by the different 907, 908, 910, 912, and/or 914 described above is for illustrative purposes and is not intended to be limiting, as any of components 907, 908, 910, 912, and/or 914 may provide more or less functionality than is described. For example, one or more of components 907, 908, 910, 912, and/or 914 may be eliminated, and some or all of its functionality may be provided by other ones of components 907, 908, 910, 912, and/or 914 and/or other components. As an example, processor 904 may be configured to execute one or more additional components that may perform some or all of the functionality attributed below to one of components 907, 908, 910, 912, and/or 914.

In FIG. 9A, the content access component 907 may be configured to access and/or manage image and/or audio content. In some implementations, the content access component 907 may be configured to effectuate image/audio content acquisition using any applicable methodologies including those described herein. By way of an illustration, the content access component 907 may be operable to instantiate content acquisition by the capture apparatus 130 based on a timer event, user instruction, or a sensor event. In some implementations, the content access component 907 may be operable to instantiate content acquisition by a camera component of the processing apparatus 902. In one or more implementations, the content access component 907 may be operable effectuate content acquisition by a VR headset. In some implementations, the content access component 907 may be operable to access previously acquired content from, e.g., electronic storage 918 and/or external resource (e.g., external storage, and/or remote user device during content upload). The operations performed by the content access component 907 may include information timestamping, adjustment of data rate, transcoding, post processing (e.g., adjusting white balance, sharpening, contrast, gamma and/or other parameters), trimming, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on 22 Oct. 2015, incorporated supra, and/or in a session container (e.g., such as described in detail in U.S. patent application Ser. No. 15/001,038, entitled "METADATA CAPTURE APPARATUS AND METHODS" filed on 19 Jan. 2016, incorporated supra).

In FIG. 9A capture FOV component 908 may be configured to obtain field of view corresponding to images of the content accessed by content access component 907. In some implementations, the image FOV_C may be obtained by decoding of lens FOV, and/or lens curvature information stored in, e.g., a metadata portion of a video container, e.g., as described in above cited application '427 and/or application '038, incorporated supra. In one or more implementation, the capture FOV component 908 may be configured to access information related to a capture device used to obtain image content, e.g., a database and/or a table containing information related to a camera model and lens characteristics (e.g., lens FOV, and/or lens curvature).

In FIG. 9A, viewing FOV component 910 may be configured to effectuate obtaining field of view associated with viewing of the content accessed by content access component 907. In some implementations, the FOV_P may be obtained by accessing information related to display device (e.g., nominal viewing FOV for given display device, e.g., 25° FOV_P for an iPad). In one or more implementations, the viewing FOV component 910 may be configured to determine FOV_P based on dimensions of display used for presenting the content (e.g., dimensions of display 916) and viewing distance. Viewing distance may be obtained using a nominal (typical value), and/or user input value. In some implementations, viewing distance may be obtained using sensor information, e.g., rear facing camera, ultrasonic range sensor, a structured light sensor, and/or other approaches.

In FIG. 9A, image transformation component 912 may be configured to obtain a transformation operation configured to adapt imaging content from capture FOV to viewing FOV using methodology of the disclosure, e.g., Eqn. 5-Eqn. 6 and/or Eqn. 7-Eqn. 8. The image transformation component 912 may be further configured to transform individual images of the content accessed via content access component 907 in accordance with the viewing FOV. In some implementations of transforming video content, individual images of video stream may be decoded (e.g., using a H.264, H.265 video decoder and/or other decoder). Decoded images may be transformed using, e.g., Eqn. 5.

In FIG. 9A, content presentation component 914, may be configured to provide transformed content. The transformed content provision may include storing transformed images on a storage component (e.g., electronic storage 918) for viewing; broadcasting content, and/or otherwise delivering content to one or more destinations (e.g., the external resource 924 (e.g., cloud content storage)). In some implementations, transformed content provision may include communication of the transformed images to the display 916.

Figure 9B:
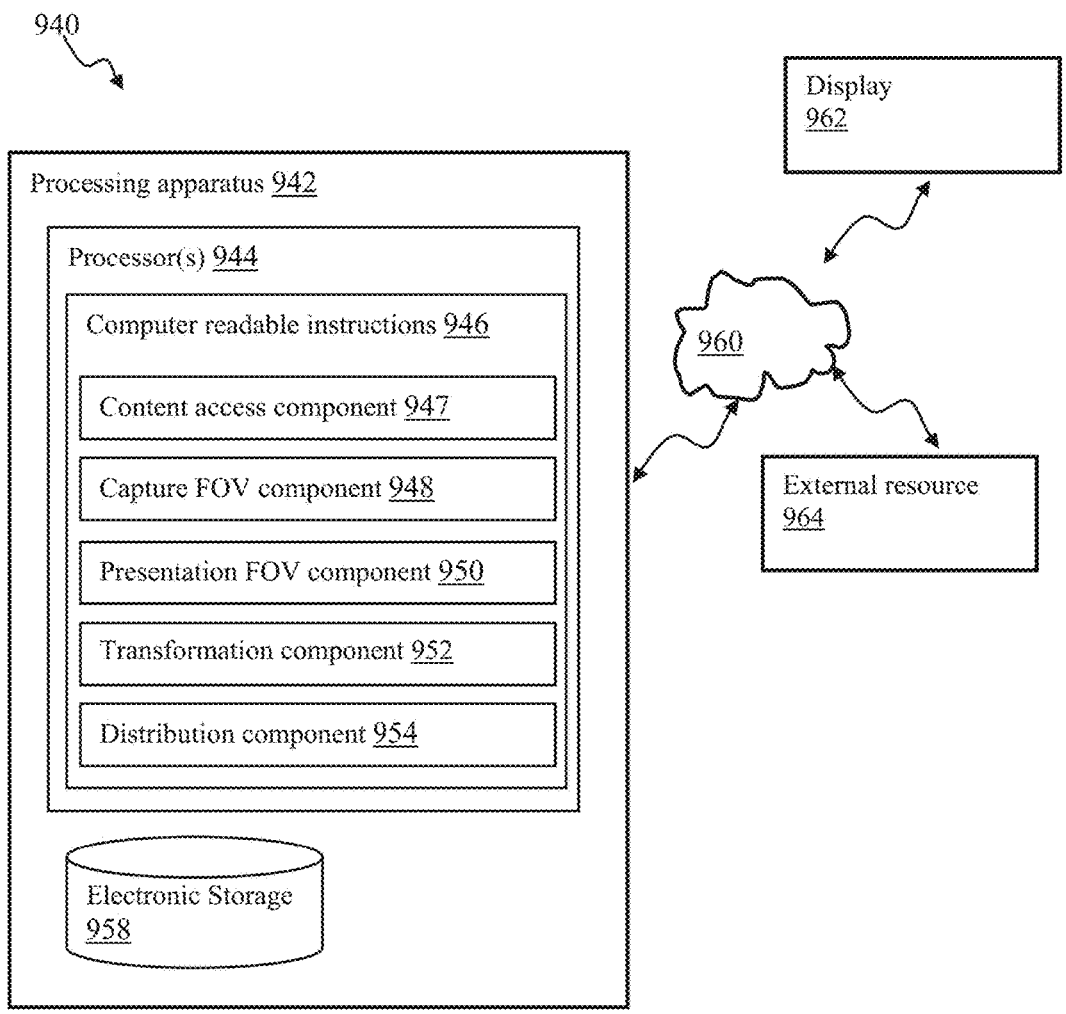
FIG. 9B is a functional block diagram illustrating a computerized content presentation system configured to implement image transformation methodology of the disclosure, in accordance with one implementation.

FIG. 9B illustrates a computerized content presentation system configured to implement image transformation methodology of the disclosure, in accordance with one implementation. The system 940 of FIG. 9B may include a processing apparatus 942 configured to implement image transformation methodology of the disclosure coupled to a display 962 via interface 960.

In some implementations, the processing apparatus 942 may correspond to a content server (e.g., Netflix, YouTube, Facebook, and/or other server). The display 962 may include one or more of e.g., a smartphone, a laptop computer, a tablet computer, a desktop computer, a smart TV, a gaming console, a digital projector, and/or other display device implementation. The display 962 may include display only (e.g., HDTV), touch sensitive display, digital light projection device, VR headset, and/or other device configured to project and/or display images. Any applicable existing (e.g., light emitting diode displays, organic LED (OLED), Digital Light Processing (DLP), electronic paper, MEMS display, combination thereof, multi-monitor display), and/or future projection technology may be utilized for displaying content in accordance with methodology of the disclosure The interface 960 may include one or more wired interfaces (e.g., serial, USB, Thunderbolt™, HDMI, Ethernet, coaxial cable, and/or other wired interfaces) and/or wireless interfaces (e.g., WiFi, Bluetooth, cellular data, and/or other interfaces). For example, such electronic communication links may be established, at least in part, via one or more networks. In some implementations, a network may comprise the Internet and/or may employ other communications technologies and/or protocols. By way of non-limiting example, the interface 960 may employ communication technologies including one or more of Ethernet, 802.11, worldwide interoperability for microwave access (Wi-MAX), 3G, Long Term Evolution (LTE), digital subscriber line (DSL), asynchronous transfer mode (ATM), InfiniBand, PCI Express Advanced Switching, and/or other communication technologies. By way of non-limiting example, the interface 960 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the interface 960 may be represented using formats including one or more of hypertext markup language (HTML), extensible markup language (XML), and/or other formats. One or more exchanges of information between entities of system 940 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 940 may use custom and/or dedicated data communications technologies instead of, or in addition to, the ones described above.

The processing apparatus 942 may include one or more physical processors 944 configured by machine-readable instructions 946 and/or other components. Executing the machine-readable instructions 946 may cause the one or more physical processors 944 to effectuate imaging content transformation using methodology of the disclosure. The machine-readable instructions 946 may include one or more of content access component 947, an capture FOV component 948, presentation FOV component 950, a transformation component 952, a distribution component 954, and/or other components.

One or more features and/or functions of the processing apparatus 942 may be facilitation of video content transformation and/or provision of content. It is noted that although the present disclosure is directed to videos and/or video clips, one or more other implementations of system 940 and/or apparatus 942 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The apparatus 942 may include communication lines or ports to enable the exchange of information with a network (e.g., 960) and/or other entities (e.g., 964). Illustration of apparatus 942 in FIG. 9B is not intended to be limiting. The apparatus 942 may include a plurality of hardware, software, and/or firmware components operating together to provide the functionality attributed herein to apparatus 902. For example, the apparatus 942 may be implemented by a cloud of computing platforms operating together as apparatus 942.

The apparatus 942 may include electronic storage 958. Electronic storage 958 may comprise electronic storage media that electronically stores information. The electronic storage media of electronic storage 958 may include one or both of system storage that is provided integrally (i.e., substantially non-removable) with apparatus 942 and/or removable storage that is removably connectable to apparatus 942 via, for example, a port or a drive. A port may include a USB port, a Firewire port, and/or other port. A drive may include a disk drive and/or other drive. Electronic storage 958 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 958 may include one or more virtual storage resources (e.g., cloud storage, a virtual private network, and/or other virtual storage resources). The electronic storage 958 may be configured to store software algorithms, information determined by processor(s) 944, information received from processing apparatus 942, information received from external resource(s), and/or other information that enables apparatus 942 to function as described herein.

The system 940 may include an external resource(s) 964 operatively linked via one or more electronic communication links 960. External resource(s) 964 may include sources of information, hosts, and/or other entities outside of system 940, external entities participating with system 940, computing platforms, and/or other resources. In some implementations, some or all of the functionality attributed herein to system 940 may be provided by resources included in external resource(s) 964.

It will be appreciated that this is not intended to be limiting and that the scope of this disclosure includes implementations in which processing apparatus 942, external resources 964, and/or other entities may be operatively linked via some other communication media.

Processor(s) 944 may be configured to provide information-processing capabilities in apparatus 942. As such, processor 944 may include one or more of a digital processor, an analog processor, a digital circuit designed to process information, an analog circuit designed to process information, a state machine, and/or other mechanisms for electronically processing information. Although processor 944 is shown in FIG. 9B as a single entity, this is for illustrative purposes only. In some implementations, processor 944 may include one or more processing units. These processing units may be physically located within a given device; the processor 944 may represent processing functionality of a plurality of devices operating in coordination. The processor 944 may be configured to execute components 947, 948, 950, 952, and/or 954. The processor 944 may be configured to execute components 947, 948, 950, 952, and/or 954 by software; hardware; firmware; some combination of software, hardware, and/or firmware; and/or other mechanisms for configuring processing capabilities on processor 944.

It should be appreciated that although components 947, 948, 950, 952, and/or 954 are illustrated in FIG. 9B as being co-located within a single processing unit, in implementations in which processor 944 includes multiple processing units, one or more of components 947, 948, 950, 952, and/or 954 may be located remotely from the other components. The description of the functionality provided by the different 947, 948, 950, 952, and/or 954 described above is for illustrative purposes and is not intended to be limiting, as any of components 947, 948, 950, 952, and/or 954 may provide more or less functionality than is described. For example, one or more of components 947, 948, 950, 952, and/or 954 may be eliminated, and some or all of its functionality may be provided by other ones of components 947, 948, 950, 952, and/or 954 and/or other components. As an example, processor 944 may be configured to execute one or more additional components that may perform some or all of the functionality attributed below to one of components 947, 948, 950, 952, and/or 954.

In FIG. 9B, the content access component 947 may be configured to access and/or manage image and/or audio content. In some implementations, the content access component 947 may be configured to effectuate image/audio content acquisition using any applicable methodologies including those described herein. By way of an illustration, the content access component 947 may be operable to instantiate content acquisition by the capture apparatus 130 based on a timer event, user instruction, or a sensor event. In some implementations, the content access component 947 may be operable to instantiate content acquisition by a camera component of the apparatus 942. In some implementations, the content access component 947 may be operable to access previously acquired content from, e.g., electronic storage 958 and/or external resource 964 (e.g., external storage, and/or remote user device during content upload). The operations performed by the content access component 947 may include information timestamping, adjustment of data rate, transcoding, post processing (e.g., adjusting white balance, sharpening, contrast, gamma and/or other parameters), trimming, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on 22 Oct. 2015, incorporated supra, and/or in a session container (e.g., such as described in detail in U.S. patent application Ser. No. 15/001,038, entitled "METADATA CAPTURE APPARATUS AND METHODS" filed on 19 Jan. 2016, incorporated supra).

In FIG. 9B capture FOV component 948 may be configured to obtain field of view corresponding to images of the content accessed by content access component 947. In some implementations, the image FOV_C may be obtained by decoding of lens FOV, and/or lens curvature information stored in, e.g., a metadata portion of a video container, e.g., as described in above cited application '427 and/or application '038, incorporated supra. In one or more implementation, the capture FOV component 948 may be configured to access information related to a capture device used to obtain image content, e.g., a database and/or a table containing information related to a camera model and lens characteristics (e.g., lens FOV, and/or lens curvature).

In FIG. 9B, presentation FOV component 950 may be configured to obtain field of view associated with presentation of the content accessed by content access component 947. In some implementations, the FOV_P may be obtained by accessing information related to a display device (e.g., nominal viewing FOV for given display device, e.g., 25° FOV_P for an iPad). In one or more implementations, the presentation FOV component 950 may be configured to determine FOV_P based on dimensions of a display used for presenting the content (e.g., dimensions of display 962) and a viewing distance. Viewing distance may be obtained using a nominal (typical value), and/or user provided value. In some implementations, viewing distance may be obtained using sensor information obtained by the display 962, e.g., rear facing camera, ultrasonic range sensor, a structured light sensor, and/or other approaches. In some implementations, display dimensions may be obtained based on executing one or more instructions of a given API, system (e.g., Android OS getDisplayMetrics( ).xdpi, method that may to return dpi of the device display).

In FIG. 9B, transformation component 952 may be configured to obtain a transformation operation configured to adapt imaging content from capture FOV to viewing FOV using methodology of the disclosure, e.g., Eqn. 5-Eqn. 6 and/or Eqn. 7-Eqn. 8. The transformation component 952 may be further configured to transform individual images of the content accessed via content access component 947 in accordance with the viewing FOV. In some implementations of transforming video content, individual images of video stream may be decoded (e.g., using a H.264, H.265 video decoder and/or other decoder). Decoded images may be transformed using, e.g., Eqn. 5.

In FIG. 9B, a distribution component 954, may be configured to provide transformed content. The transformed content provision may include storing transformed images on the storage component 958 for subsequent viewing; providing transformed images to external storage (e.g., component 958) for storing/viewing, broadcasting content, and/or otherwise delivering content to one or more destinations (e.g., cloud content storage). In some implementations, transformed content provision may include communication of the transformed images to the display 962.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", "link", "transmission channel", "delay line", "wireless" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A system for providing images of imaging content, the system comprising:
    an electronic storage configured to store the imaging content;
    a communications interface configured to communicate a bit stream to a client device, the client device including a display; and
    one or more processors configured to execute a plurality of computer readable instructions configured to:
        access the imaging content characterized by a capture field of view and a capture projection;
        determine a presentation field of view associated with displaying the images of the imaging content on the display, wherein the presentation field of view is determined based on dimensions of the display and a viewing distance between the display and a user;
        obtain a transformation operation configured to transform the images of the imaging content from the capture projection based on the capture field of view and the presentation field of view; and
        transform the images of the imaging content for presentation on the display using the transformation operation.

2. The system of claim 1, wherein the capture projection includes a fish eye projection.

3. The system of claim 1, wherein the viewing distance between the display and the user is determined based on sensor information generated by a sensor.

4. The system of claim 3, wherein the sensor includes a proximity sensor or a light sensor.

5. The system of claim 1, wherein the viewing distance between the display and the user is determined based on a typical viewing distance associated with a type of the client device.

6. The system of claim 1, wherein the transformation operation accounts for a mismatch between the capture field of view and the presentation field of view.

7. The system of claim 1, wherein the transformation operation includes a curve-to-rectilinear transformation based on a match between the capture field of view and the presentation field of view.

8. A method for transforming images of imaging content, the method comprising:
    obtaining an image capture field of view using a meta data portion of the imaging content;
    determining a dimension of a display of a content display device;
    obtaining a viewing distance between the display and a user using sensor information;
    obtaining a viewing field of view based on the viewing distance and the dimension of the display; and
    obtaining an image transformation operation to transform the images of the imaging content from an image source projection based on the capture field of view and the viewing field of view.

9. The method of claim 8, wherein the image transformation operation reduces apparent motion within the images of the imaging content.

10. The method of claim 8, wherein the image transformation operation is applied to the images of the imaging content by a server.

11. The method of claim 8, wherein the image transformation operation is applied to the images of the imaging content by a camera or a smartphone.

12. The method of claim 8, wherein the image transformation operation is applied to the images of the imaging content in real-time as a function of the viewing distance between the display and the user.

13. The method of claim 12, wherein the image transformation operation includes a first image transformation operation obtained based on a first viewing field of view and a second image transformation operation obtained based on a second viewing field of view.

14. A portable content display system, comprising:
a display;
a communications interface; and
one or more processors configured to execute a plurality of computer readable instructions configured to:
  access a source image of imaging content via the communications interface;
  obtain a capture field of view of the source image;
  obtain dimensions of the display;
  obtain a presentation field of view based on a viewing distance between the display and a user and the dimensions of the display;
  obtain an image transformation to transform the source image from a capture projection to a display projection, the image transformation configured based on the capture field of view and the presentation field of view; and
  obtain a transformed image based on applying the image transformation to the source image.

15. The portable content display system of claim 14, wherein the image transformation is configured based on a ratio of the capture field of view to the presentation field of view.

16. The portable content display system of claim 14, wherein the imaging content includes a video or a sequence of images.

17. The portable content display system of claim 14, wherein the capture field of view is obtained based on curvature information of an optical element used to capture the imaging content.

18. The portable content display system of claim 17, wherein the curvature information includes coefficients of a polynomial representation characterizing a curvature of the optical element.

19. The portable content display system of claim 17, wherein the curvature information is stored in meta data of the imaging content.

* * * * *